United States Patent
Savage et al.

(10) Patent No.: US 7,437,550 B2
(45) Date of Patent: *Oct. 14, 2008

(54) SYSTEM FOR PROVIDING SESSION-BASED NETWORK PRIVACY, PRIVATE, PERSISTENT STORAGE, AND DISCRETIONARY ACCESS CONTROL FOR SHARING PRIVATE DATA

(75) Inventors: Colin Savage, New York, NY (US); Christopher Petro, Elmhurst, NY (US); Sascha Goldsmith, Brighton, MA (US)

(73) Assignee: Ponoi Corp., New York, NY (US)

( * ) Notice: Subject to any disclaimer, the term of this patent is extended or adjusted under 35 U.S.C. 154(b) by 685 days.

This patent is subject to a terminal disclaimer.

(21) Appl. No.: 10/695,507

(22) Filed: Oct. 28, 2003
(Under 37 CFR 1.47)

(65) Prior Publication Data
US 2004/0143738 A1    Jul. 22, 2004

Related U.S. Application Data

(63) Continuation of application No. PCT/US02/08275, filed on Apr. 19, 2002, which is a continuation-in-part of application No. 09/453,239, filed on Dec. 2, 1999, now Pat. No. 6,442,687.

(51) Int. Cl.
*H04L 9/00* (2006.01)
*H04K 1/00* (2006.01)
*H04N 7/16* (2006.01)
*H04L 9/32* (2006.01)

(52) U.S. Cl. ............ 713/156; 713/155; 705/74; 709/203; 709/229; 726/6; 726/27

(58) Field of Classification Search ......... 713/155–156; 705/74; 709/203, 229; 726/6, 27
See application file for complete search history.

(56) References Cited

U.S. PATENT DOCUMENTS 5,748,739 A    5/1998    Press (Continued)

OTHER PUBLICATIONS

Goldberg, et al., "Freedom Network 1.0 Architecture and Protocols," Zero-Knowledge Systems, Inc., Nov. 29, 1999.

(Continued)

*Primary Examiner*—Ayaz Sheikh
*Assistant Examiner*—Trang Doan
(74) *Attorney, Agent, or Firm*—Hughes Hubbard & Reed LLP; Ronald Abramson; Peter A. Sullivan

(57) ABSTRACT

The invention provides secure and private communication over a network, as well as persistent private storage and private access control to the stored information, which is accomplished by imposing mechanisms that separate a user's actions from their identity. The system provides (i) anonymous network browsing, in which event the anonymity system is unaware of both the user's identity and browsing activities, (ii) private network storage and retrieval of data such as passwords, profiles and files in a manner such that the data can be stored into the system and later retrieved without the system knowing the contents or owners of the data, and (iii) the ability of the user to control and manage access to the remotely stored data without the system knowing the contents, owners, or accessors of the data.

3 Claims, 22 Drawing Sheets

U.S. PATENT DOCUMENTS

| | | | | |
|---|---|---|---|---|
| 5,909,491 A | * | 6/1999 | Luo | 380/270 |
| 5,923,885 A | | 7/1999 | Johnson et al. | |
| 5,961,593 A | | 10/1999 | Gabber et al. | |
| 6,061,448 A | * | 5/2000 | Smith et al. | 380/282 |
| 6,088,799 A | | 7/2000 | Morgan et al. | |
| 6,195,432 B1 | | 2/2001 | Takahashi et al. | |
| 6,353,661 B1 | * | 3/2002 | Bailey, III | 379/93.25 |
| 6,385,596 B1 | * | 5/2002 | Wiser et al. | 705/51 |
| 6,397,261 B1 | * | 5/2002 | Eldridge et al. | 713/171 |
| 6,442,687 B1 | * | 8/2002 | Savage | 713/156 |
| 6,564,321 B2 | * | 5/2003 | Bobo, II | 713/168 |
| 6,615,218 B2 | * | 9/2003 | Mandal et al. | 707/102 |

OTHER PUBLICATIONS

Mark Grennan, "Firewall and Proxy Server HOWTO," http://www.grenna.com/Firewall-HOWTO.txt, v0.70, Oct. 19, 1999, website printout date May 25, 2000.

Michael K. Reiter et al., "Crowds: Anonymity for Web Transactions," http://www.research.att.com/projects/crowds/, Technical paper link of AT&T Labs-Research, website printout May 25, 2000.

Zero Knowledge, "Partner Programs, F.A.Q. (frequently asked questions)," http://www.zeroknowledge.com/partners/aip.asp, website printout dated May 25, 2000.

* cited by examiner

EXAMPLE INTERNET DIAGRAM

SESSION INITIALIZATION

REQUEST TRANSMISSION

RESPONSE TRANSMISSION

SESSION TERMINATION

| <<implementation class>> |
| --- |
| Identity |
| -queueIdentifier : byte[]<br>-messageDecrypter : byte[]<br>-ownerIdentifier : byte[]<br>-ownerVerifier : byte[]<br>-crypto : transient AsymmetricCryptoPackage |
| +getOwnerVerifier() : byte[]<br>+assertOwnership(in cryptography : CryptoManager, in handle : ChallengeHandle) : Challenge<br>+assertAuthorship(in cryptography : CryptoManager, in handle : ChallengeHandle) : Challenge<br>+assertMembership(in cryptography : CryptoManager, in handle : ChallengeHandle, in identity : byte[]) : Challenge<br>+decryptMessage(in cryptography : CryptoManager, in messageKey : byte[], in settings : CryptoSettings, in messageBody : byte[]) : byte[] |

| <<enumeration>> |
| --- |
| recordType |
|  |
|  |

| <<implementation class>> |
| --- |
| Grant |
| -type : recordType<br>-grantor : String<br>-description : String<br>-permissionValue : int |
| +getType() : recordType<br>+getGrantor() : String<br>+getDescription() : String<br>+getPermissionValue() : int<br>+toString() : String |

Figure 14 (cont'd)

SYSTEM FOR PROVIDING SESSION-BASED NETWORK PRIVACY, PRIVATE, PERSISTENT STORAGE, AND DISCRETIONARY ACCESS CONTROL FOR SHARING PRIVATE DATA

CROSS-REFERENCE TO PENDING APPLICATIONS

This application is a continuation application of international patent application number PCT/US02/08275, filed on Apr. 19. 2002, which in turn is a continuation-in-part of then U.S. patent application Ser. No. 09/453,239, filed Dec. 2, 1999, issued on Aug. 27, 2002, as U.S. Pat. No. 6,442,687, and hereby incorporates said U.S. patent application Ser. No. 09/453,239 by reference, and claims the benefit of the filing date thereof and further claims the benefit of the filing date of U.S. provisional patent application 60/285,200, filed Apr. 20, 2001, and hereby incorporates said U.S. provisional patent application 60/285,200 by reference. This application also claims priority based on PCT application PCT/US00/30168, filed Nov. 30, 2000.

BACKGROUND OF THE INVENTION

1. Field of the Invention

This invention generally relates to the field of communications and more particularly to systems and methods for providing secure and private communications over a digital network, including session protection privacy, private remote data storage of data and user access control over such remotely stored private data.

2. Description of the Related Art

It is well known that individuals using telecommunications networks are continuously exposed to compromises of their privacy. This issue has become particularly acute with respect to the Internet. In many cases Internet hosts, service providers and Web sites can link users with their identities, and track and create databases of their activities. Voluntary privacy policies and related certification organizations such as Truste® have imposed some limits on Internet privacy abuses, but do not by any means assure end user privacy or anonymity.

As shown in FIG. 1, a client system 100 is connected over a telecommunications link 110 to an Internet Service Provider (ISP) (not shown) and ultimately to the Internet 150. A Web server (Third-Party HTTP server 160) is connected over its own link 161 to the Internet 150. Properly addressed Internet Protocol (IP) packets may be exchanged over the Internet 150 between client 100 and Web server 160. FIG. 1A shows the layout of a typical IP packet, including a header 191 containing, among other information, a source address 192 and a destination address 193, as well as data portions, 194, 195, comprising, in this example, 452 "octets" (bytes) of data.

Client system 100 runs Web browser software 105 which establishes a display window visible to the user. Web browser 105 submits an http request 125 over the internet. The IP packet containing request 105 contains a header that is encoded with the IP address of client 100. Furthermore, Web server 160 may have previously given a "cookie" to client 100, containing information regarding the user of client 100. Information from this cookie may also be encoded as data within the IP request. Thus, when Web server 160 receives http request 125, it may acquire considerable identity information regarding the user, and will of course further have complete information about the action requested by the http request. The correlation of action and identity is particularly valuable to marketers, yet at the same time most threatening to users when in the hands or people outside their confidence and control.

Web server 160 parses the http request, and processes it, serving up the Web page requested by the user, and/or conducting further processing via a "common gateway interface" (CGI) 185, which in turn may invoke further processing via scripts and programs 180, which may in turn communicate with databases such as database 190 and/or other facilities. The requested information is sent back to client 100 by http response 175, again encoded in addressed IP packets and sent to client 100 over the Internet 150. Web browser software 105 receives the http response 175 and from it creates the appropriate screen displays or multimedia effects for the end user.

The system commonly used in the prior art to provide some means of isolating an end user from total exposure to the Internet is known as a "fire-wall" or "proxy server". Proxy server 140 is shown in FIG. 1 as an optional addition to a prior art Internet communication system. Web browser software 105 is adjusted through a setup or configuration facility to direct and receive IP packets in the first instance from proxy server 140, instead of the usual router, gateway or similar facility of the ISP. Proxy server 140 can then intermediate, and thereby filter undesired or unacceptable input or output (which may be so deemed for any number of reasons, including security and censorship, in addition to privacy), and can also reconstruct IP packets so as to some extent mask the user's identity. However, the operator of the proxy server can readily retrieve, and perhaps secretly misuse, any of this information. Therefore, to be effective, the end user must trust the administrator of the proxy server in question. In a commercial setting, and most particularly in a mass market setting, establishing and maintaining such trust in an entity may not be practicable.

Another set of privacy-related systems that has been deployed to a limited extent are "anonymous remailers". These use various techniques to separate the body of an email message from its identifying header and to resend it the intended recipient under the remailer's headers. The difficulty with such systems, such as the well-known remailer at anon.penet.fi in Finland, is that the server administrator has access to both the identity and content information, rendering it vulnerable to abuse or disclosure. In the case of anon-.penet.fi, the disclosure was forced by a subpoena obtained by the Church of Scientology and enforced in Finland, which required the server administrator to hand over records of communications from a user that were the subject of a lawsuit by the Church against the user.

Other systems for protecting end user privacy have been developed. Typically such systems involve setting one or more proxies in series either locally on an end user's computer or on one or more servers. Such systems generally provide privacy protection by masking the identity of the sender from third party servers.

For example, one system, Crowds, which was developed by AT&T, enhances privacy by sharing http requests randomly among a group of subscribed users. With Crowds, although the identity of a request sender can trace the identity of a request sender to the group of users, the third party cannot be traced to any specific user.

Various cryptographic methods, including but not limited to public-private key cryptography, symmetric key cryptography, one-way hash cryptography, have been used for privacy-enhancing purposes. Such methods have been applied in one system, Zero Knowledge, to provide anonymity by encapsulating identity information in encrypted form in a surrounding packet created by an intermediate or proxy server. However, in such a system, the operators of the intermediate or proxy server have access to both identify and action information, and could compromise that information or be forced to give it up to governmental or private parties by subpoena or other legal process.

Other systems have used cryptographic techniques to provide for encrypted remote data storage. In such approaches, data is typically sent to server through protected channel such as Secure Socket Layer (SSL) connection. On receipt of data at server, server generates cryptographic key and stores the data. The result of such systems is that data is protected in transit and while stored. However, such systems still suffer from the drawbacks that the identity of end user is known to storing server, and that the contents of stored data are known to storing server just prior to the data being encrypted for local storage.

Systems that have provided access control for remotely stored data have generally followed the following model:

A data is request sent to server through protected channel such as Secure Socket Layer (SSL) connection; and On receipt of the data request at the server, the server checks the request against secondary access control system that contains an index of data objects, users, and associated access privileges.

The result of such a system is that data requests are protected in transit and data requests can be controlled according to access rights on the server. However, such a system has the drawbacks that (i) the identity of end user is known to server; (ii) the contents of stored data are known to server; and (iii) the data request is known to server. The result is that such systems do not provide for strong protection of user identities or stored data. Managers of such systems can easily obtain any and all information passing through the system, as can malicious attackers.

The system disclosed here provides greater security than prior solutions. The system described here goes beyond masking the identity of the sender from third parties and masks the identity of the sender from both third parties and the system itself. This masking is accomplished by separating action from identity on the client computer. By way of comparison, while the Crowds system prevents third-parties from knowing the identities of senders, the Crowds system itself, and the other systems discussed above, have the ability to know both the identity and actions of its users. The greater security provided by the system has the additional benefit of enabling more personal communications to be sent through the system. Because the system does not rely on removing identifying information for its functionality, end users can receive the benefits of identity protection without sacrificing the ability to act as individuals rather than anonymous entities.

BRIEF SUMMARY OF THE INVENTION

It is an object of the present invention to provide a system whereby, without relying on trust, an end user can securely and privately use communications networks. The invention seeks to provide users with a greater degree of privacy than is available with existing technologies.

Among the areas of functionality sought to be provided by the present invention are the following: (i) session protection to provide for private browsing of networks; (i) private remote data storage and retrieval; and (ii) private access control exercisable by the user with respect to remotely stored private data.

Other objects of the invention include the following:

A system that is secure. Both operational and cryptographic security are desirable. Cryptographic protocols employed in this project must preferably be both proven and "strong".

A system that does not record the actions of its users. The system should not be able to link the actions of users to the identities of users, though it may record either separately. This separation is a fundamental design objective in providing personal and portable privacy protection.

A system that enables anonymous authentication and authorization for anonymous stored data within digital communications networks.

A system that functions in a reliable manner. Operation should be consistent and, in the event of failure, the system should notify its users and terminate without interfering with other functioning processes on its host computers.

A system that reduces the need for user interaction. Preferably, the services provided by the system should be transparent to its users Preferably, a system that functions without the persistent installation of software on client computers, and is instead accessible from any compatible network computer or other access device.

Preferably, a system that functions on a wide variety of host platforms and architectures.

Preferably, a system that is able to accommodate a large number of concurrent users.

To accomplish the session protection objectives of the invention,

The system separates a user's identity and action. The identity and action information are encrypted and forwarded to an identity server (which knows the user's identity but cannot decrypt the action information); the identity server forwards the encrypted action information to a action server (to which the action is anonymous), which carries out the action, encrypts the results and forwards them to the identity server (which cannot know them because they are encrypted), which in turn returns them to the user, which has a decryption key for the returned data.

In this system only the client may recombine or associate identity and action

In this system, only the client may view identity and action in plain-text together In this system, all communications between client and server are encrypted To accomplish the private persistent data storage aspects of this invention:

The system allows individuals and computer applications to store data remotely onto the network in such a way that the storage provider cannot identify the owner or contents of stored data; in such a way that other individuals and computer applications can access all or part of the stored data; and in such a way that the access control manager cannot identify the identity or access privileges of individuals or computer applications and cannot identify the contents of stored data. In one embodiment, this may be done by treating the data storage request as an "action" an also creating a "user object" to be held by the action server but retrievable by the user, to catalog the user's privately stored data.

In this system, the client encrypts all data prior to storage in the database

In this system, the system is not able to decrypt any individual object

In this system, the system is not be able to associate one object with another

In this system, the system is not be able to associate an object with its owner

To accomplish the aspect of the invention involving private access control to stored data:

The system stores data privately as discussed above. A further "action" is permitted, in which one user can grant access to a second user, or to a group of users. The access is effectuated by passing keys and pointes through a "message queue" maintained on the action server and examinable by users when they retrieve their respective user objects.

In this system, the system enforces access control restrictions on the server, not on the client, without knowing the identity of the accessor, the contents of the data he is accessing, or their access privilege.

In this system, the system allows end users and client applications to grant, change, or revoke access to stored data and user groups.

The manner in which the invention achieves these and other objects is more particularly shown by the drawings enumerated below, and by the detailed description that follows.

BRIEF DESCRIPTION OF THE DRAWINGS

The following briefly describes the accompanying drawings.

DETAILED DESCRIPTION

Figure 1:
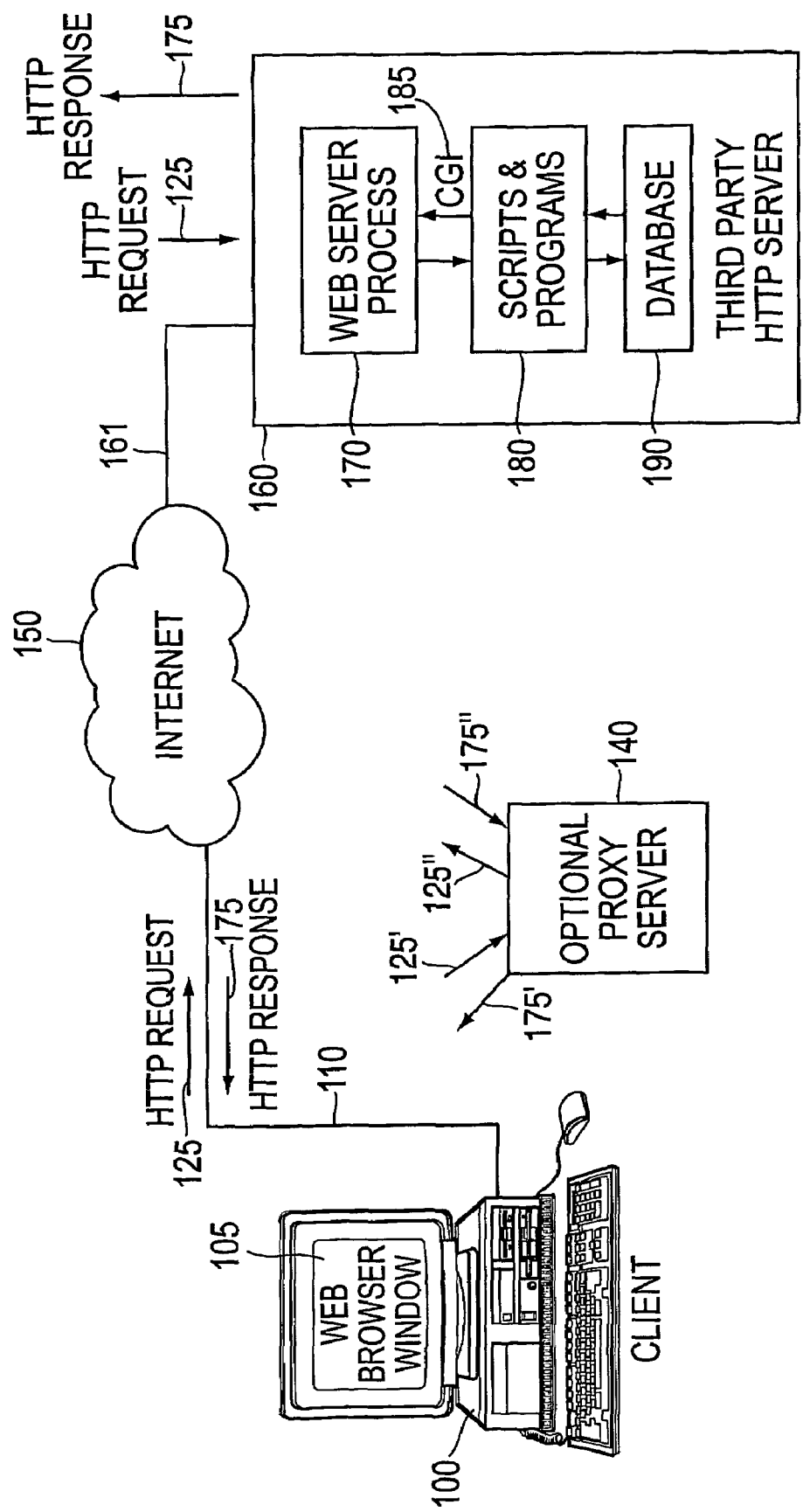
FIG. 1 shows a prior art system whereby Web browser software communicates over the Internet with a Web server, optionally through the intermediate means of a proxy server.
Figure 1A:
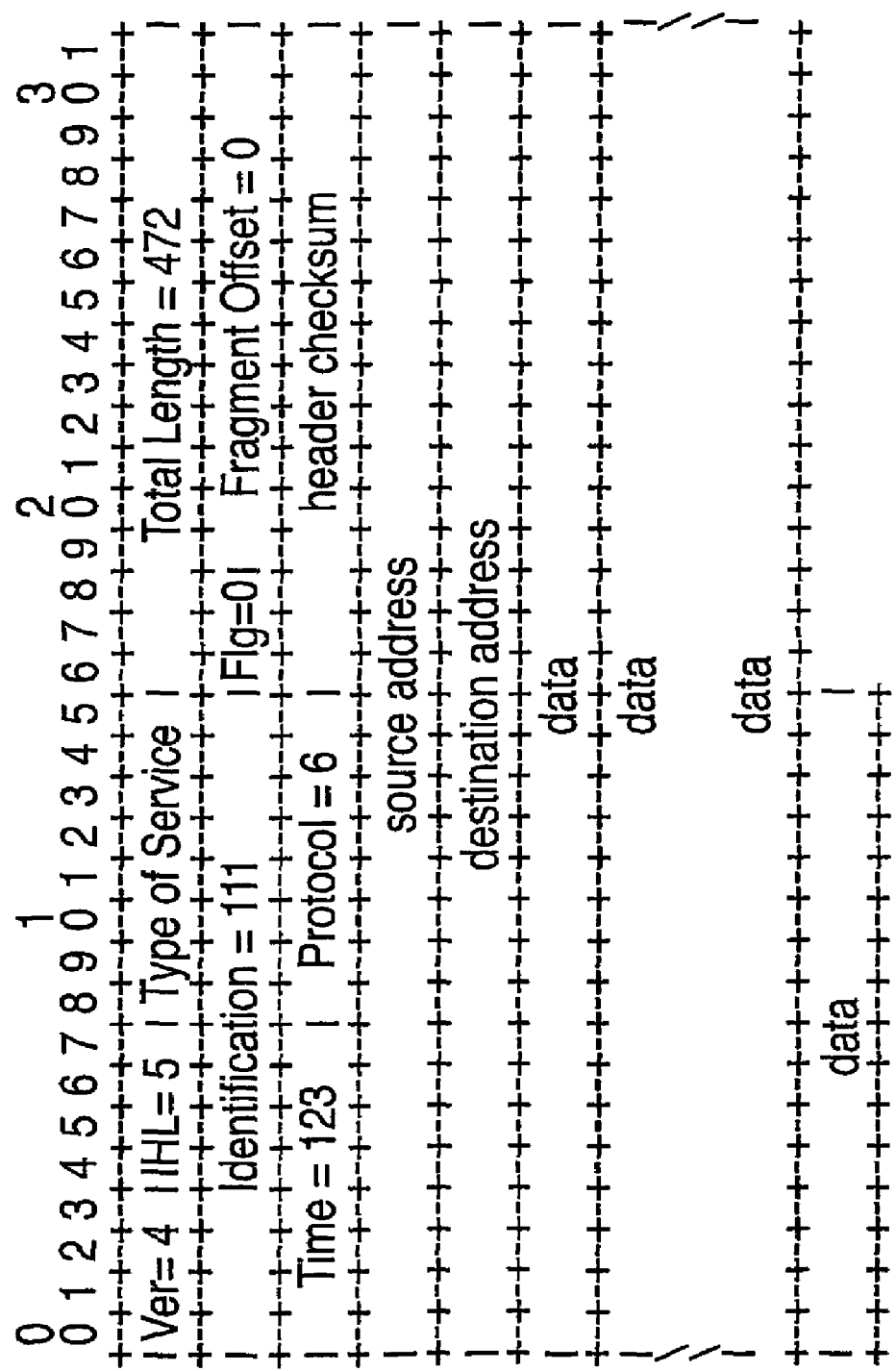
FIG 1A shows the header and data layout of a typical IP packet as used over the Internet.
Figure 2:
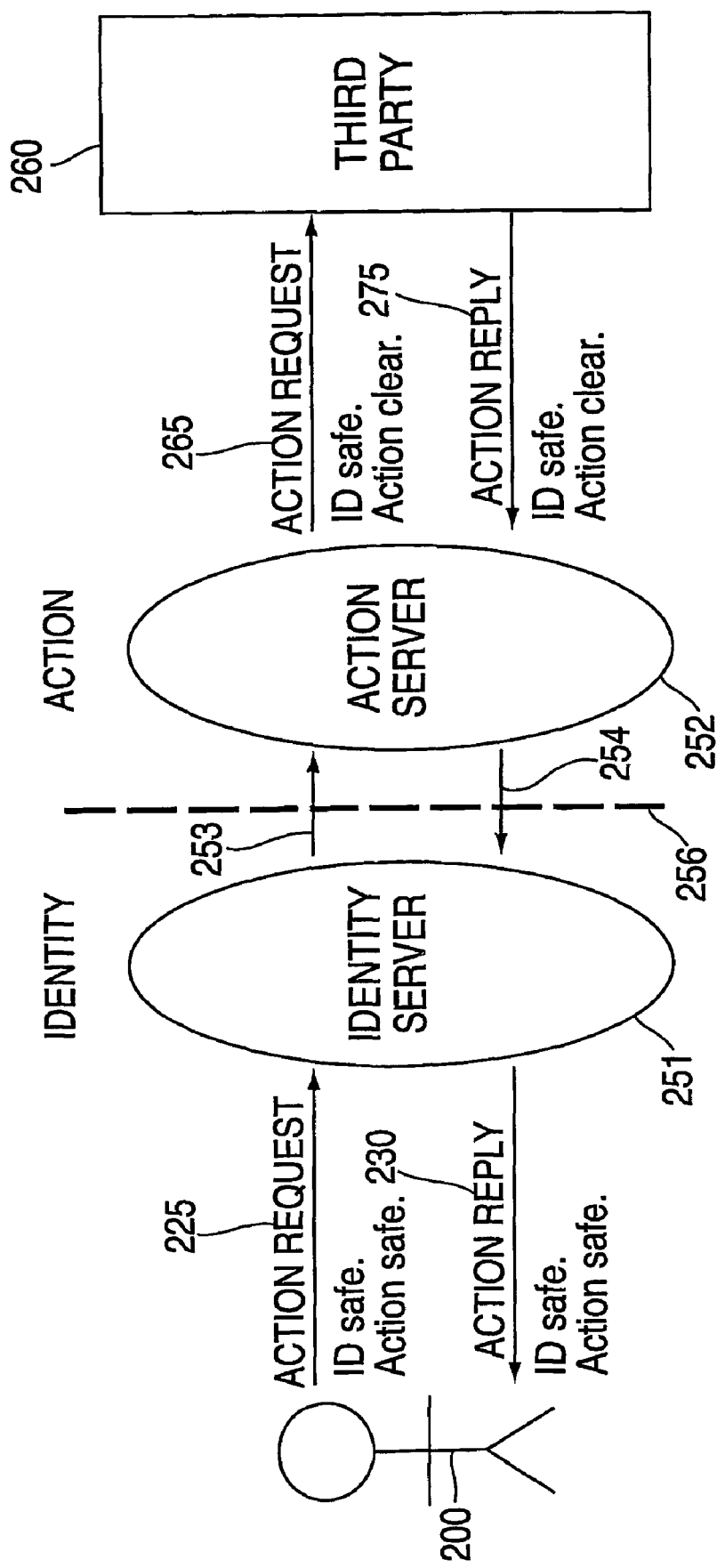
FIG. 2 is a block diagram showing the system architecture employed in connection with an embodiment of the Ponoi session protection aspect of the invention.

Various embodiments of the invention are illustrated in FIGS. 2-16, and described in the text that follows. Although the invention has been most specifically illustrated with particular embodiments, it should be understood that the invention concerns the principles by which such embodiments may be constructed and operated, and is by no means limited to the specific configurations shown.

We first address issues of terminology. For purposes of this disclosure, we will take "anonymity" to mean the de facto separation of an entity's actions from its identity—and therefore from any distinguishing characteristics.

Further definitions used herein include the following:

HTML: Hypertext Mark-up Language

HTTP: Hypertext Transfer Protocol

MIME: Multimedia Internet Mail Extensions

IP: Internet Protocol (version 4)

JAR: Java Archive

JDK: Java Development Kit

JRE: Java Runtime Environment

SSL: Secure Socket Layer

URI: Universal Resource Identifier

URL: Universal Resource Locator

WWW: World Wide Web

"Ponoi session protection" means conducting communications over a network with the use of a system as claimed in the parent United States patent application, U.S. Ser. No. 09/453,239, specifically, "A system for providing communications over a network, by means including at least a client and a remote server, wherein a user may submit a request through said client for a specified action to be performed in response to said request by said remote server, said user-submitted request comprising identity information that identifies the user making the request, and action information that specifies the action requested from said remote server by said user, and wherein said communications are provided in a secure and anonymous manner in that said action information is submitted to said remote server without revealing said identity information to said remote server, and in that only said client, and not any facility through which said action information or any response thereto passes in the course of being submitted to or received from said remote server, possesses both said identity information and said action information, said system comprising (in addition to said client and remote server):

a) an application that separates said identity information and said action information from the user's information request, encrypts said identity information and said action information, and sends said identity information and said action information as so encrypted to a first intermediate server;

b) said first intermediate server, which contains means for decrypting said encrypted identity information but not said encrypted action information, and for transmitting said encrypted action information to a second intermediate server;

c) said second intermediate server, which contains means for decrypting said action information, transmitting said decrypted action information to said remote server, receiving the remote server's response, encrypting said remote server response, and transmitting said encrypted remote server response to said first intermediate server;

d) said first intermediate server further having means for receiving said encrypted remote server response from said second intermediate server, associating said encrypted remote server response with said identity information and sending said encrypted remote server response to said application;

said application further having means for decrypting said remote server response and forwarding said decrypted remote server response to said client for presentation to the user."

The present disclosure makes a distinction between enabling anonymity, in which case privacy results from stripping all unique information from a user, and privacy, in which case identifying information is retained but kept secure.

The first embodiment discussed, which provides "Ponoi session protection" (sometimes referred to herein as the "system"), consists of three major components that participate in relaying anonymous HTTP requests to a Web server via IP. In reading the following description, general reference should be made to FIGS. 2, 4, 5 and 6.

1. The first component of the system is a client application (for example, Java applet client 606) that acts as an HTTP proxy for a user's web browser software while they are connected to the system. This application is the only portion of the system that resides on client systems (such as client system 100) and will be communicated to those systems via the world-wide-web (for example, by ftp or http download from a server (not shown) associated with what is referred to in FIG. 6 as the "privacy" or "system" facility 300.

2. The second component is an identity server 251, which is part of privacy facility 300, that receives requests 225 from the client application and forwards them for further processing. The identity server 251 maintains the information required to transmit information back to a user for the duration of that user's HTTP session. Portions of a user's request 225 that contain information concerning the destination of that request—or that permit divination of the request—must never be accessible to the identity server.

3. The third and final component of the system is an action server 252 that performs HTTP requests on behalf of the system's users (e.g., user 200, etc.). The action server (252) must never have access to information that is specific to an individual user of the system, rather, it acts on behalf of the identity server 251 and return the results 275 of a user's HTTP request to the identity server 251 for transmission to the client.

The mechanism by which the identity server 251 is prevented from accessing information about the destination of an HTTP request and by which the action server 252 is prevented from accessing information about the source of a request is a communication protocol that employs public key cryptographic techniques. See generally, Rivest, et al., U.S. Pat. No. 4,405,829. By employing cryptographic techniques to guarantee that the system internally separates identity information from action information, we also guarantee that this separation is maintained on either side of the system facility 300. Because of this secure encryption, third parties monitoring network traffic going to or coming from any of the servers in the system facility, either legally or illegally, are never able to connect an action taken by the server to the identity of a user who is connected to the server. In addition, the persons administering such servers also do not have any means for making such a connection. Thus, it is not necessary for such administrators to be trusted by users of the system in order for such users to derive the security and anonymity benefits provided by the invention.

In the "privacy" or "system" facility referred to above, the identity server, action server and other elements thereof can be separate processes on a single machine or processor, processes on separate machines or processors. Such servers and other elements can be under the same administration or separate administration. The determination of such matters is not critical to the invention.

Rules:

The system preferably functions in accordance with the following rules:

The action server 252 has full knowledge of individual's actions but no knowledge of individual's identity The identity server 251 has full knowledge of individual's identity but no knowledge of individual's actions The Java applet client 606 separates identity and action information Each of the action server 252, identity server 251 and Java applet client 606 have a unique pair of public-private keys The action server 252 and Java applet client 606 can communicate with one another only by passing encrypted requests through identity server Flow of Processing The flow of processing in the system is illustrated in FIGS. 7-10.

Session Initialization

Figure 7:
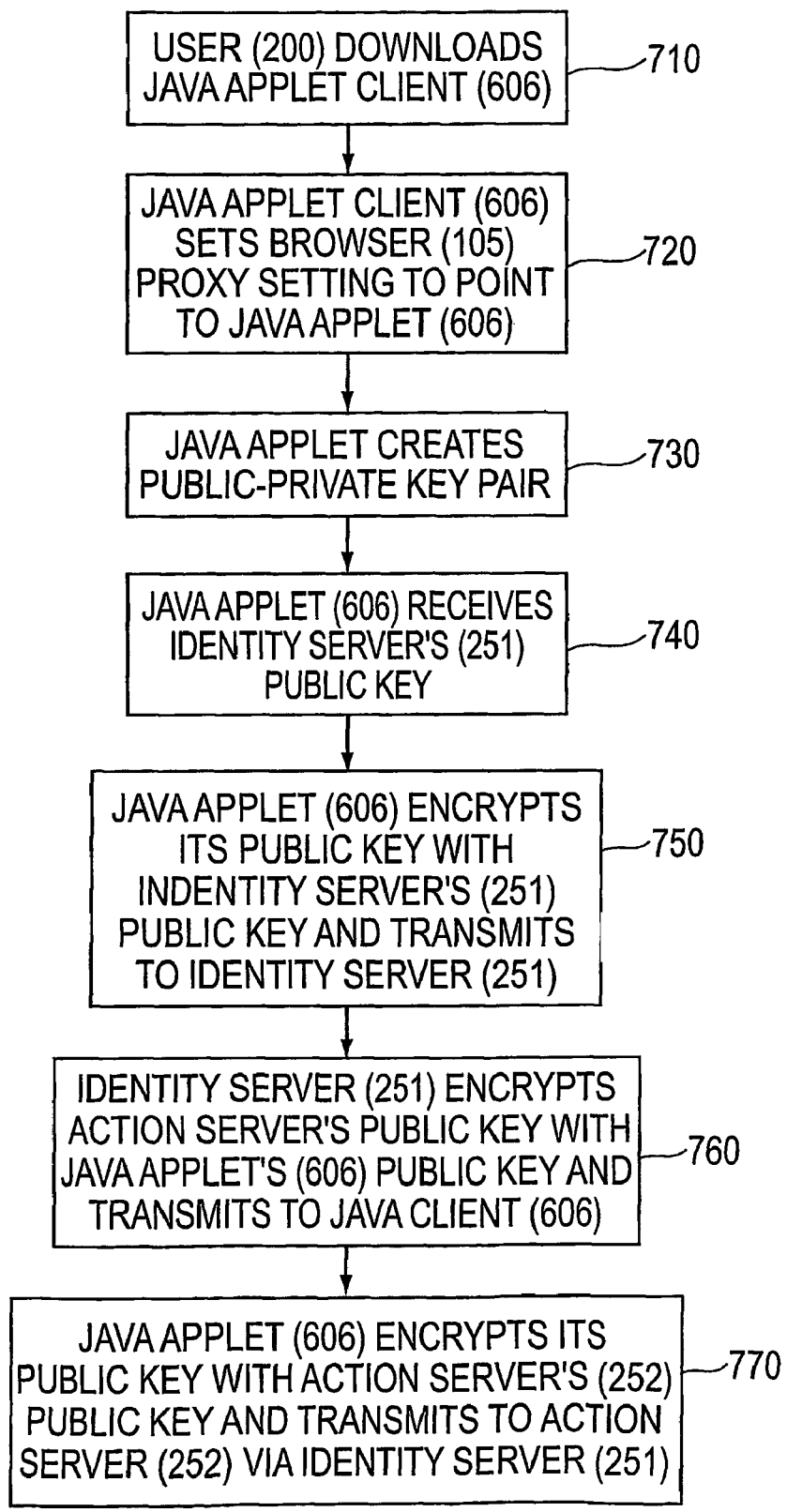
FIG. 7 is a flow chart showing the steps involved in the session initialization portion of the methods employed in connection with an embodiment of the Ponoi session protection aspect of the invention.

As shown in FIG. 7, system initialization 710 begins when user 200 who is running a Web browser 105, downloads the code for Java applet client 600 from a server associated with the system facility 300. Next, 720, the Java applet client 606, running under Web browser 105, changes browser 105's proxy setting to direct http requests through the Java applet.

Then, 730, the Java applet client 606 creates public-private key pair.

In step 740, Java applet client 606 receives identity server's (251) public key.

In step 750, the Java applet client 606 encrypts its public key with the identity server's (251) public key and sends its public key, so encrypted, to identity server 251.

In step 760, the identity server 251 encrypts action server's (252) public key with the Java applet client's (606) public key, and sends action server's (252) public key, so encrypted, to Java applet client 606.

In step 770, Java applet client 606 encrypts its public key with the action server's (252) public key and sends its public key, so encrypted, to action server (252) via identity server 251.

Request Transmission

Figure 8:
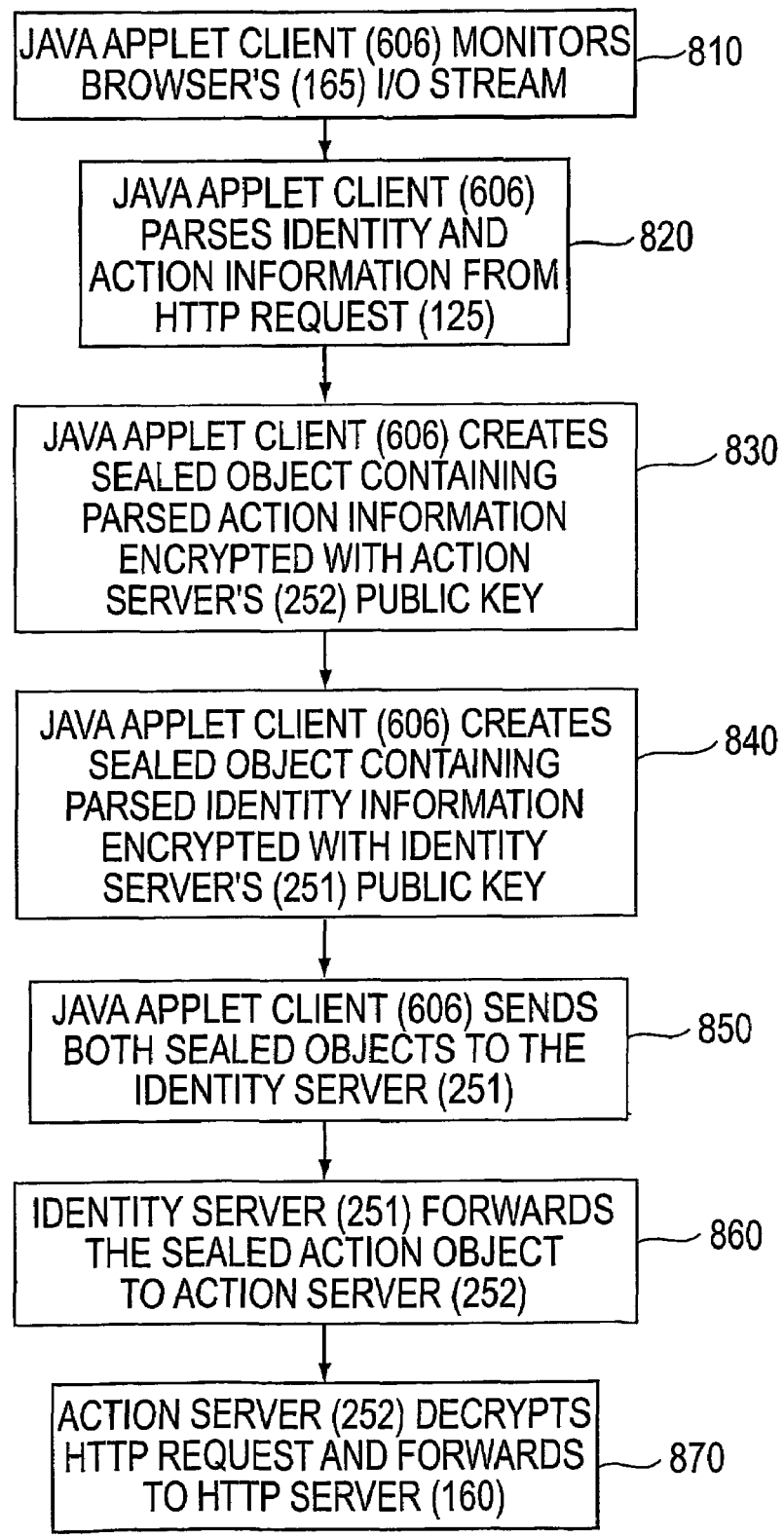
FIG. 8 is a flow chart showing the steps involved in the request transmission portion of the methods employed in connection with an embodiment of the Ponoi session protection aspect of the invention.

As shown in FIG. 8, request transmission comprises the following steps:

In step 810, Java applet client 606 monitors the input-output streams from browser 105.

In step 820, when an http request 125 is sent by browser 105, Java applet client 606, which has been configured as such browser's http proxy, receives the request and parses it into separate identity and action information.

In step 830, Java applet client 606 creates a first sealed object containing the action information for the http request 125, encrypted with the action server's (252) public key.

In step 840, the Java applet client 606 creates a second sealed object containing the identity information for the http request 125 encrypted with the identity server's (251) public key In step 850, Java applet client 606 sends both sealed objects to the identity server 251.

In step 860, identity server 251 forwards the action sealed object to the action server 252.

In step 870, action server 252 decrypts action information for the http request and forwards it, preferably through another intermediate http proxy (not shown), to the destination third part server.

Response Transmission

Figure 9:
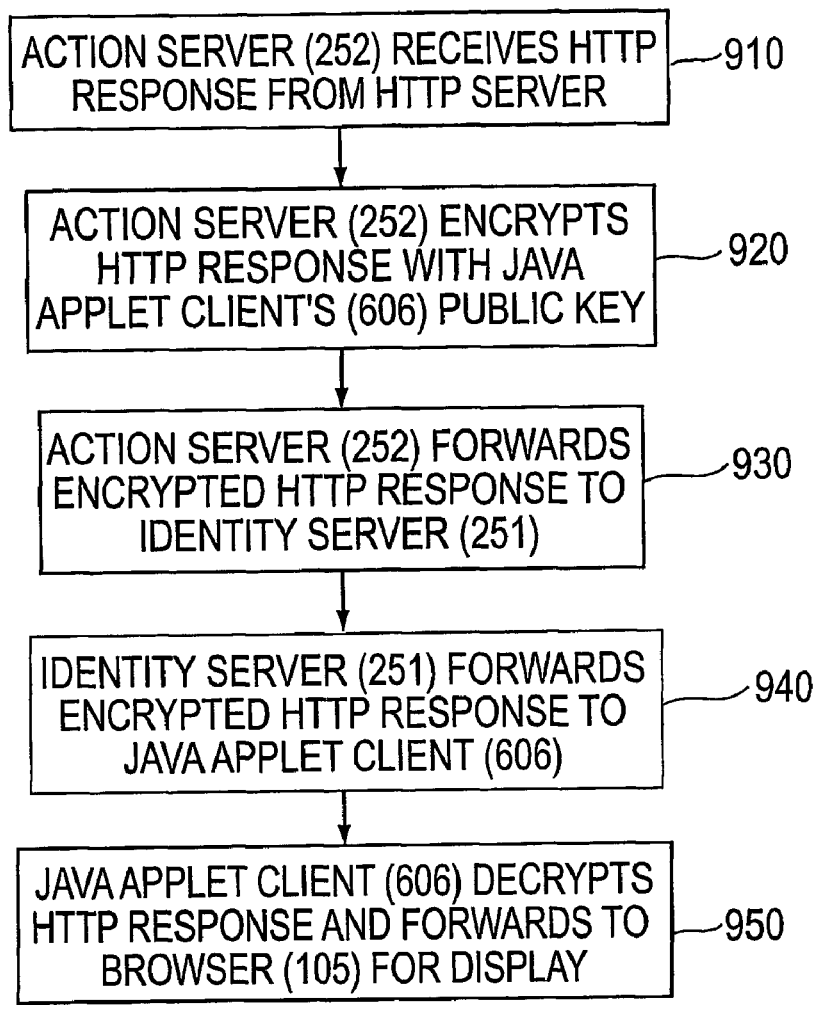
FIG. 9 is a flow chart showing the steps involved in the response transmission portion of the methods employed in connection with an embodiment of the Ponoi session protection aspect of the invention.
Figure 10:
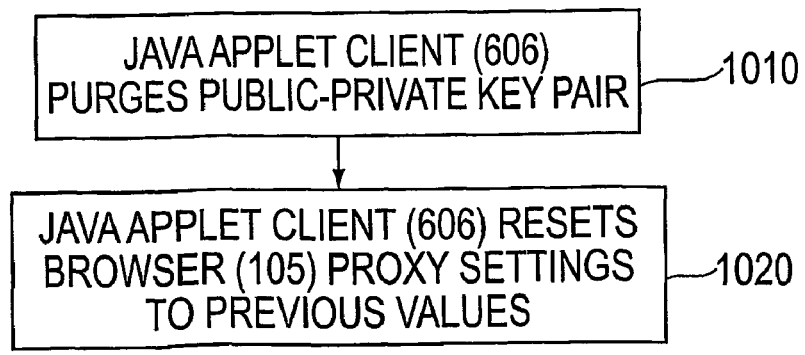
FIG. 10 is a flow chart showing the steps involved in the session termination portion of the methods employed in connection with an embodiment of the Ponoi session protection aspect of the invention.

As shown in FIG. 9, response transmission comprises the following steps:

In step 910, the action server 252 receives http response 275 from the third-party server, preferably through said intermediate http server.

In step 920, action server 252 encrypts http response 275 with the Java applet client's (606) public key.

In step 930, action server 252 forwards encrypted http response 230 to identity server 251.

In step 940, identity server 251 forwards encrypted http response 230 to Java applet client 606.

In step 950, Java applet client 606 decrypts http response 230 and forwards it to browser 105 for display.

Session Termination

As shown in FIG. 109, session termination comprises the following steps:

In step 1010, Java applet client 606 purges public-private key pair it has created.

In step 1020, Java applet client 606 resets browser 105 proxy settings to previous values.

Other Functionality

Figure 3:
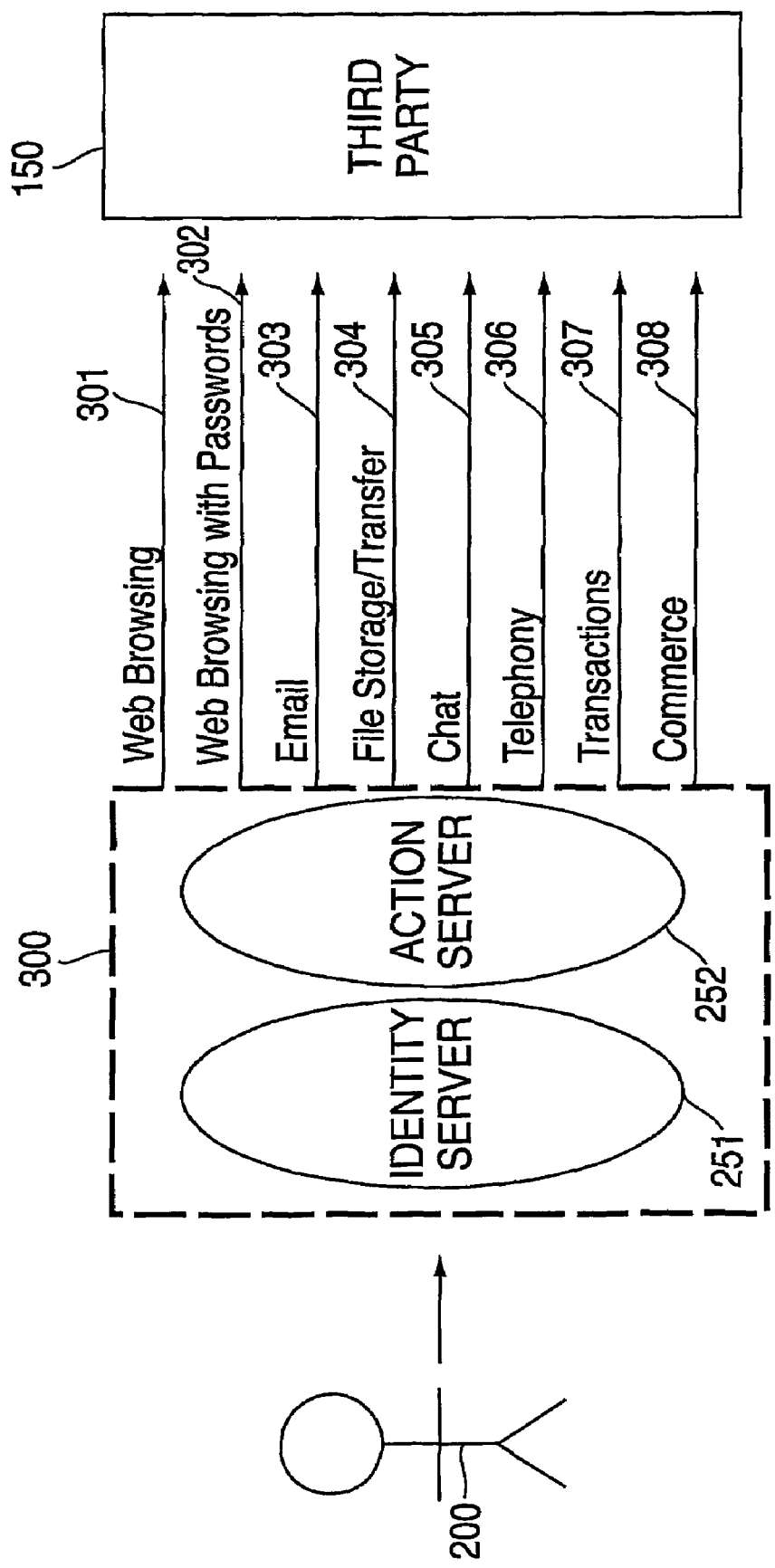
FIG. 3 is a diagram showing a range of additional functions that may be provided based in part on the technology of the Ponoi session protection aspect of the present invention.
Figure 4:
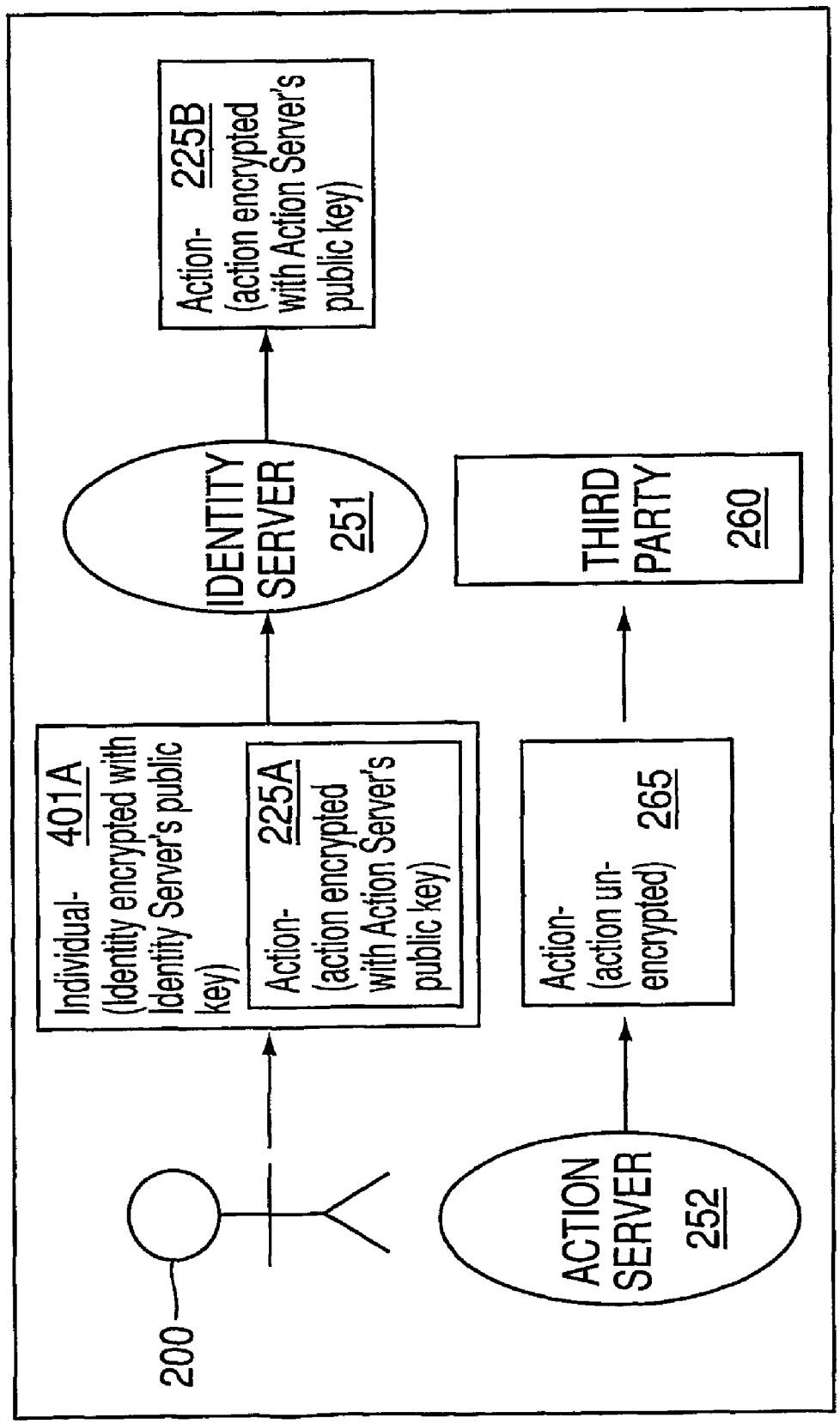
FIG. 4 is a block diagram showing the request transmission side of a transaction in accordance with an embodiment of the Ponoi session protection aspect of the invention.
Figure 5:
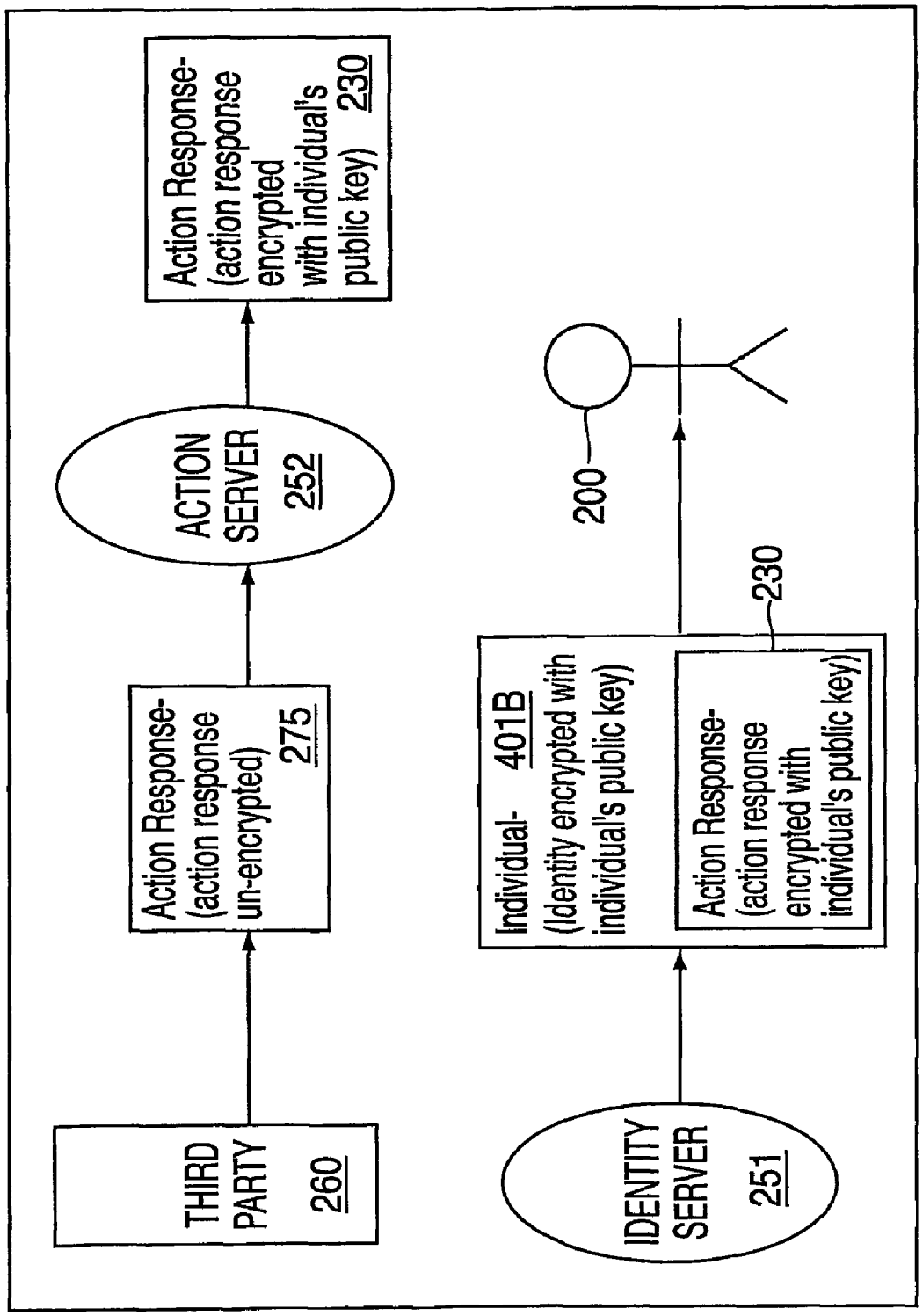
FIG. 5 is a block diagram showing the action response side of a transaction in accordance with an embodiment of the Ponoi session protection aspect of the invention.
Figure 6:
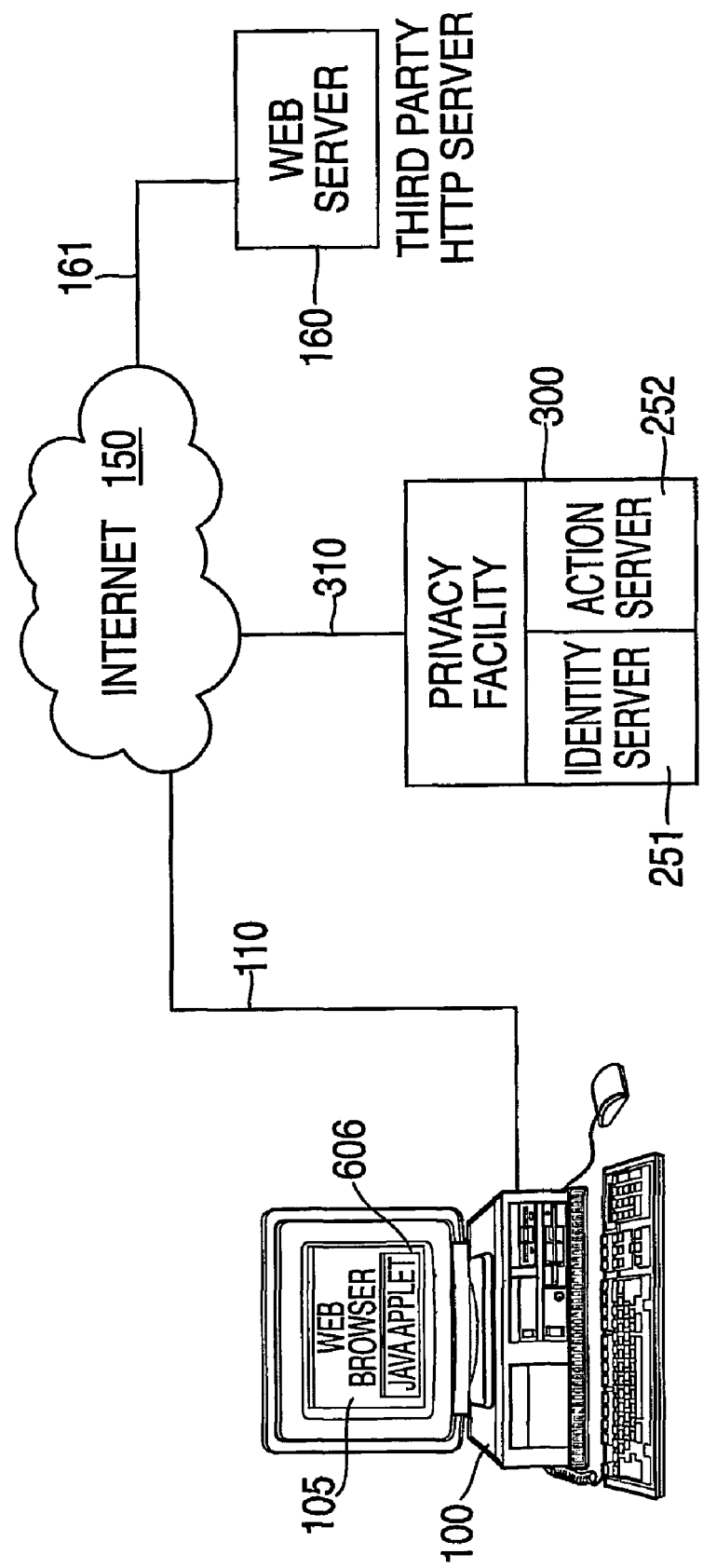
FIG. 6 is a block diagram showing the principal physical components utilized in connection with an embodiment of the Ponoi session protection aspect of the present invention, and their interconnection over the Internet.

FIG. 3 reflects other functionality in addition to simple network navigation and Web browsing 301 that is provided in connection with the invention. Such functionality includes without limitation Web browsing with passwords 302, electronic mail 303, file storage and transfer 304, chat 305, telephony 306, transactions 307, and electronic commerce 308.

Further Description of System Components

What follows is a more detailed description of the various system components of a first embodiment and their operation.

Proxy Client

The proxy client of the first embodiment, a small footprint java applet 606, is the system component responsible for connecting end-users to the system. It functions as an HTTP proxy server and service HTTP requests from a user's web browser. Requests transferred through the system proxy client are encrypted and transferred to the identity server. Responses received by the proxy client from the action server via the identity server are decrypted and returned to a user's web browser.

Upon invocation from a known URL on the world-wide-web, the proxy client is loaded from a JAR file by a client web browser. Once loaded, the proxy client generates and/or retrieve the cryptographic data required to establish a secure communication channel with the system action server, and automatically configures the user's web browser to use the proxy client as a proxy server for browsing the world-wide-web (or alternately prompts the user to make this setting manually).

After receiving an HTTP request generated by a user's web browser, the proxy client establishes a secure connection to the identity server using the communication protocol discussed later in this disclosure. In the event of connection failure, the proxy client informs the user of the failure via a dialog box, and configuration changes to the user's web browser are reversed. Assuming a connection to the identity server can be successfully established, the proxy client filters all identify information from the current HTTP request, removing HTTP header data or replacing header values with non-identifying defaults as necessary. The HTTP request is then be appended to any cryptographic data required for response transmission and both are be encrypted using the cryptographic protocol specified as part of the the system communication protocol (see Communication Protocol section below). Encrypted data is then be placed within a well formed the system protocol request, and the request is transmitted to the identity server.

Once a request has been sent from the proxy client to the identity server, the proxy client waits for a response. If a valid response is received, that response is be decrypted and returned to the user's web browser. Should the system fail to respond to a proxy client's request for a specified timeout interval, the proxy client aborts request processing and returns an error page to the user's web browser.

Server Architecture

Identity Server

Upon receiving a request from a web browser, the proxy client applet initiates a connection to the identity server. Once this connection is established the identity server reads the contents of an encrypted HTTP request from the proxy client. Should a valid request not be received within a specified time-out interval, the identity server 251 terminates the connection with the proxy client applet.

After receiving an encrypted client request, the identity server establishes a communication connection with the action server, and forward the request for further processing. In the event that a connection between the Identity and action servers cannot be established, the identity server terminates its connection with the proxy client applet. Once a connection is successfully established and those portions of the client request not related to the client's identity have been transferred, the identity server waits for a response from the action server. Again, in the event that a response is not received within a specified time-out interval, the identity server terminates its connection with the proxy client applet. Finally, valid response data received from the action server is forwarded to the proxy client applet, and all IP connections are terminated.

Action Server

The action server 252 is a background process that resides on a computer system associated with system facility 300. Its role is to execute HTTP requests on behalf of users of the system, and act as an end-point for the cryptographically secure communication channel by which data is transferred between the system's back-end facilities and its users. Once the identity server has received an HTTP request, a connection is established between the identity server and an action server residing on a different physical computer. This connection is used to forward the HTTP request to the action server where it is decrypted. After decryption, the clear text HTTP request is forwarded to a standard HTTP proxy server that retrieves the requested URL and returns it to the action server. Should the HTTP proxy fail to respond within a specified time-out interval, the action server terminates its IP connections with both the proxy server and the identity server. If a valid HTTP response is received by the action server, that response is encrypted using the cryptographic data provided along with the HTTP request, and the response is returned to the proxy client via the identity server.

Communication Protocol

Within the system, a single communication protocol is used to relay HTTP requests from the proxy client applet to the identity server and from the identity server to the Action Server. This protocol contains encrypted HTTP data augmented with a cryptographic key exchange mechanism and a minimal amount of control information. Two transmission formats are defined by this specification, the first for communication to the action server, and the second for communication by the action server.

Request Format

HTTP requests transmitted by the proxy client to the identity server for processing by the action server is formatted as follows:

TABLE 1

| Client Transmission Format | | |
|---|---|---|
| Clear text | Encrypted | |
| Header | Public Key | HTTP Request |

Each transmission consists of three distinct parts. The first is a 96-bit long clear text header block that contains control information for the transmission. The second and third portions are encrypted data blocks of variable length. The header is immediately followed by the proxy client's public key in order to permit responses from the action server to be encrypted for transmission to the proxy client. The HTTP Request received from a user's web browser follows the public key.

TABLE 2

| Client Header Format | | | |
|---|---|---|---|
| 8 | 16 | 24 | 32 |
| 'E' | 'D' | 'N' | 'T' |
| Protocol Version | Public Key Length | Public Key Length | HTTP Request Data Length |
| HTTP Request Data Length | HTTP Request Data Length | HTTP Request Data Length | End of Header Marker (0x00) |

Magic Cookie (bits 0-31): An identifier used to rapidly indicate a valid transmission. All components of the system shall terminate communications that do not begin with this sequence.

Response Format

HTTP responses transmitted by the action server to the proxy client are formatted as follows:

TABLE 3

| Server Transmission Format | |
|---|---|
| Clear text | Encrypted |
| Header | HTTP Response |

Each transmission consists of two distinct parts. The first is an 80-bit long clear text header block that contains control information for the transmission. The second portions is an encrypted data block of variable length containing the HTTP response for a client's request

TABLE 4

| Server Header Format | | | |
|---|---|---|---|
| 8 | 16 | 24 | 32 |
| 'E' | 'D' | 'N' | 'T' |
| Protocol Version | HTTP Response Data Length | HTTP Response Data Length | HTTP Response Data Length |
| HTTP Response Data Length | End of Header Marker (0x00) | | |

Magic Cookie (bits 0-31): A unique identifier used to rapidly indicate a valid transmission. All components of the system shall terminate communications that do not begin with this sequence.

Protocol Version (bits 32-39): A number used to identify the version of the protocol for future compatibility. The version of the protocol used in the prototype implementation will be 0x01 (one).

HTTP Response Data Length (bits 40-72): Length of the encrypted HTTP Response in bytes.

End of Header Marker (bits 73-80): The literal value 0x00 (zero) used to delimit the header and data portions of a transmission.

Further Embodiments

Figure 11:
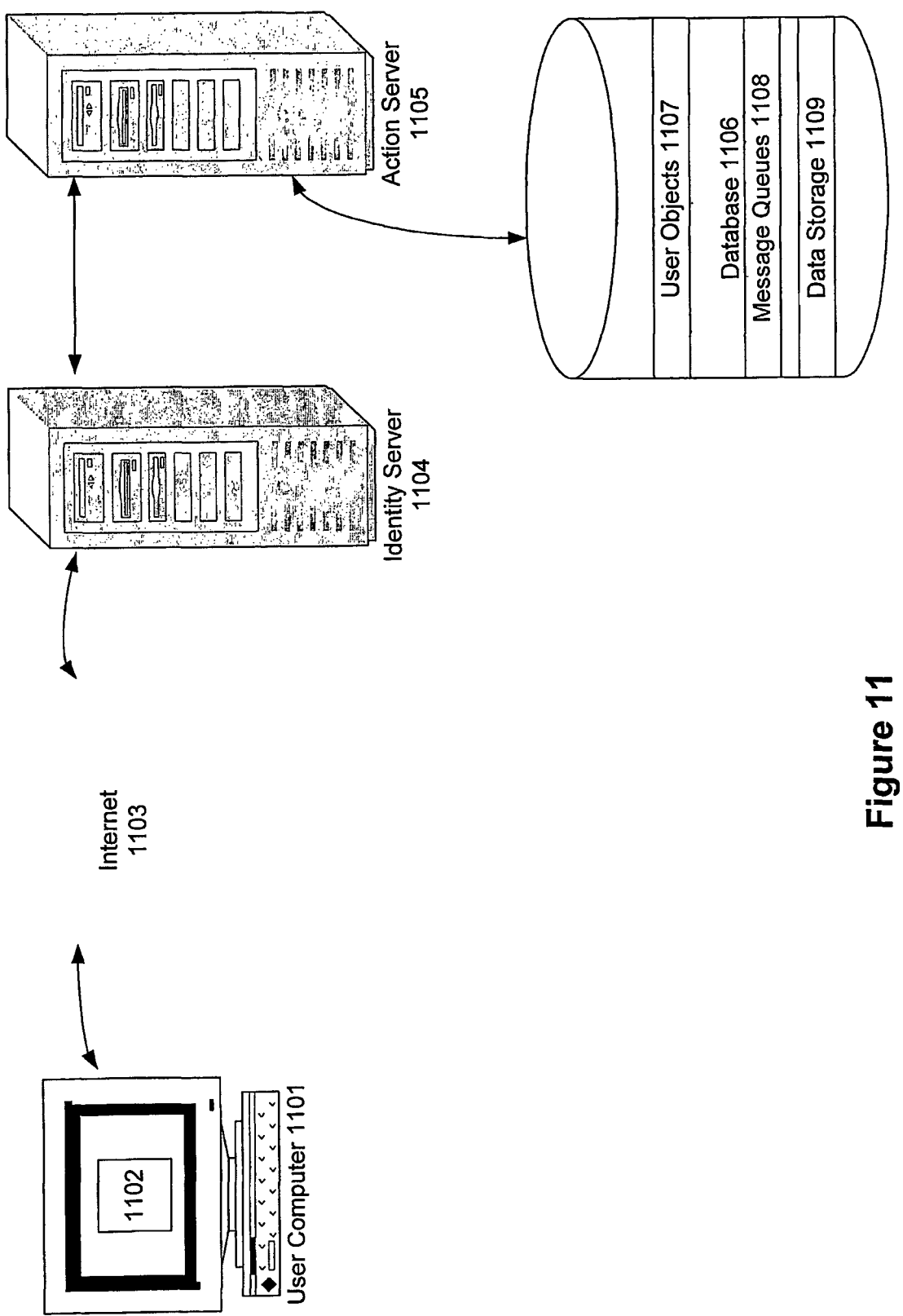
FIG. 11 is a component-level block diagram showing some of the functional components employed in connection with additional embodiments of the invention that provide private persistent storage and access control.
Figure 12:
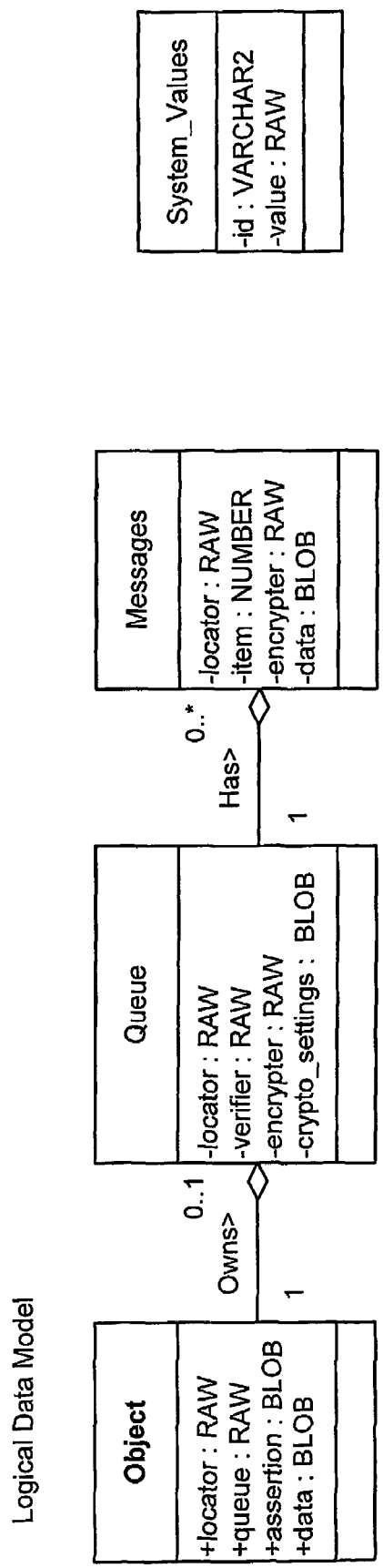
FIGS. 12-16 are Unified Modeling Language (UML) diagrams of certain objects employed in the implementation of various embodiments of the invention.

Further embodiments of the invention are discussed in connection with the component block level diagram shown in FIG. 11, and the UML diagrams of system objects shown in FIGS. 12-16.

Overview of System Implementation

Two primary types of data exist encrypted in the database: persistent objects and access control data. Persistent objects include binary data, collections and users. Access control data is used to validate that a given user's request is allowed under the permissions set up by the object's owner. Cryptography protects both the persistent objects and their associated access control entries such that the system never has sufficient information to decrypt both, or to associate a given access control entry with an object persistently.

Summary of Private Persistent Storage Capabilities

The private persistent storage capabilities provided by one embodiment of the invention involve the following (with reference to FIG. 11):

A client application residing on the end user's (or end computer's) computer (1101).

A first intermediate, or identity, server (1104)

Zero or more further intermediate identity servers

A second intermediate, or action, server (1105)

The system has the goal of protecting stored, or persistent, data such that:

Only the owner of stored data knows the contents of the stored data

Only the owner of stored data knows who owns a set of data

Stored data can be accessed from any point on the communications network (1103)

The server portions of the system cannot decrypt stored data objects

The server portions of the system cannot associate one object with another

The server portions of the system cannot associate an object with its owner

Specific implementations of this system and method can vary across computer and network platforms, can exist at different points in the network stack, on different platforms, as hardware or as software, using symmetric or public-private key cryptography algorithms. A simple implementation is used below to illustrate the system and method in practice.

In this implementation, the client application is a Java applet within an end user's web browser; the first intermediate server is known as the identity server; the second intermediate server is known as the action server; and there are no further intermediate servers.

To store data in one embodiment, the following steps are employed:
  (a) Generating within the client application (1102) a first encryption key and a first decryption key. These can be a public-private key pair, or symmetric keys can be used in combination with a public-private key pair;
  (b) encrypting the data within the client using the first encryption key;
  (c) generating a data object identifier within the client application. This can be a pseudorandom number, preferably a very large pseudorandom number to minimize any possibility of the same identifier being derived in a subsequent session and/or by a different user;
  (d) creating a data object that contains the data object identifier and the encrypted data;
  (e) sending the data object to the action server (1105) through the identity server (1104) in accordance with the session protection methods described above (Ponoi session protection). Note that there can be a plurality of identity and/or action servers;
  (f) storing the data object in a database (1106) under the control of the action server, using the data object identifier as a locator;
  (g) writing the data object identifier to a user object (see FIG. 13) within the client application. Note that a user object can hold other data in addition to that described for this storage application, and that there can be a hierarchy of data objects with one being regarded as the "root data object". In general, the user object described here is sometimes referred to as the "hierarchical user object";
  (h) writing the first decryption key to the user object;
  (i) generating within the client application a user object encryption key based on information private to the user and reproducible in future sessions by the user, in a manner such that the private information cannot practicably be derived from the user object encryption key. Note that there are many possibilities for how such keys and identifiers may be generated (here as well as with respect to the other applications describer herein). One approach is to take double-hash the user's password, add it to the user's ID and has the result;
  (j) encrypting the user object with the user object encryption key;
  (k) generating within the client application a user object identifier based on information private to the user and reproducible in future sessions by the user, in a manner such that the private information cannot practicably be derived from the user object identifier; Note that there are many possibilities for how such keys and identifiers may be generated. One approach is to use a hash of the user's ID;
  (l) associating the user object identifier with the user object;
  (m) sending the user object and user object identifier to the action server through the action server in accordance with Ponoi session protection; and
  (n) storing the user object in the database (1106, 1107), using the user object identifier as a locator.

Result: End user has stored data remotely, can access that data in the future. Storing system does not know identity of end user or contents of stored data or location of keys to decrypt stored data.

To retrieve data in one embodiment, the following steps are employed:
  (a) generating within the client application (1102) (which may be a Java applet) a user object identifier in accordance with the same method and based on the same information that was used to generate the user identifier by which the data had previously been stored. To do this, the end user would input authentication tokens such as username and password;
  (b) sending the user object identifier and a request for a user object to the action server (1105) through the identity server (1104) with Ponoi session protection. Again, there can be a plurality of identity and/or action servers on the network;
  (c) if the user object identifier matches a user object identifier previously stored by the action server, sending the requested user object to the client application through the identity server under Ponoi session protection. The requested user object residing on the action server comprises a data object decryption key and a data object identifier is encrypted with a user object encryption key;
  (d) generating within the client application a user object decryption key in accordance with the same method and based on the same information that was used to generate the user object encryption key for storage purposes;
  (e) decrypting the user object using the user object decryption key,
  (f) selecting from the decrypted user object the data object identifier corresponding to the encrypted data desired to be retrieved;
  (g) sending the data object identifier and a request for the encrypted data to the action server through the action server in accordance with Ponoi session protection;
  (h) within the action server, retrieving the encrypted data from a database (1106) under the control of the action server, using the data object identifier as a locator;
  (i) sending the encrypted data to the client application through the action server in accordance with the method of claim 1;
  (j) reading the data object decryption key from the decrypted user object;
  (k) decrypting the encrypted data with the data object decryption key; and
  (l) making the decrypted data available to the user.

Result: End user has retrieved stored data without revealing identity to holder of data.

Upon the conclusion of a user session all keys may be deleted on the client side. Keys for the hierarchical user object can be regenerated by the client based on the user's authentication token. Keys for stored objects can be read from the hierarchical user object.

Although the foregoing was presented in the context of a system comprising first and second intermediate servers and Ponoi session protection, such as system could use any other means of network storage, such as a stand-alone storage server with which client applications communicate via secure socket layers (SSL). In addition, a system involving the use of Ponoi session protection could be configured such that data transfers were broken down into data increments and a plurality of identity and action servers were employed in a distributed processing manner.

Summary of Access Control Capabilities

The access control capabilities provided by one embodiment of the invention involve the following:

A client application residing on the end user's computer or interoperating with a computer application.
A first intermediate, or identity, server
Zero or more further intermediate identity servers
A second intermediate, or action, server The system has as a goal protecting stored, or persistent, data such that:

Only the owner of stored data and others with access rights to stored data know the contents of the stored data
Only the owner of stored data and others with access rights to stored data know who owns a set of data
Stored data can be accessed from any point on the communications network
The server portions of the system cannot decrypt stored data objects
The server portions of the system cannot associate one object with another
The server portions of the system cannot associate an object with its owner or others with access rights to stored data
Stored data can be accessed by other individuals and applications, not just the data owner
Access controls to stored data are applied remotely, on the server
The server portions of the system cannot know access privileges associated with a set of data and/or a set of individual(s) or application(s).
End users and/or computer applications can control the users and groups who have access to stored data Specific implementations of this system and method can vary across computer and network platforms, can exist at different points in the network stack, on different platforms, as hardware or as software, using symmetric or public-private key cryptography algorithms. A simple implementation is used below to illustrate the system and method in practice.

In this implementation, the client application is a Java applet within an end user's web browser; the first intermediate server is known as the identity server; the second intermediate server is known as the action server; and there are no further intermediate servers.

To store data and grant access to data in one embodiment, the following steps are employed:

(a) identifying the data to be stored and the user who is to have access thereto;
(b) generating within the client application (1102) a first encryption key and a first decryption key;
(c) encrypting the data within the client using the first encryption key;
(d) generating a data object identifier within the client application;
(d) generating a challenge public-private key pair for the data;
(e) reading with the client application an identifier for the accessing user;
(f) generating a coded user identifier from the user identifier in a manner such that the user identifier cannot practicably be deduced from the coded user identifier;
(g) sending the coded user identifier to the action server (1105) together with a request for the accessing user's message queue public key, through the identity server (1104), in accordance with Ponoi session protection;
(h) the action server identifying the message queue public key associated with the coded user identifier and returning the message queue public key to the client application through the identity server, in accordance with Ponoi session protection;
(i) creating a message object comprising the data object identifier, the first decryption key, and the private challenge key;
(j) encrypting the message object with the message queue public key;
(k) sending the encrypted message object to the message queue on the action server associated with the coded user identifier, through the identity server, in accordance with Ponoi session protection;
(l) creating a data object comprising the data object identifier, the encrypted data, and the public challenge key;
(m) sending the data object to the action server through the identity server, in accordance with Ponoi session protection;
(n) the action server storing the encrypted data in a database (1106, 1109) under the control of the action server, using the data object identifier as a locator and maintaining an association with the public challenge key.

Result: Data stored in private, protected fashion. Data accessible by party other than owner. Central data holder does not know contents or owner of stored data. Central data holder does not know access rights of others to stored data.

To retrieve data to which access has recently been granted, in one embodiment, the following steps are employed:

(a) the accessing user providing authentication token to client application (1102);
(b) generating within the client application a user object identifier based on the authentication token in the same manner previously used to generate the user object identifier associated with the accessing user on the action server;
(c) sending the user object identifier and a request for a user object to the action server (1105) through the identity server (1104) in accordance with the method of claim 1;
(d) if the user object identifier matches a user object identifier previously stored by the action server, sending the requested user object to the client application through the identity server in accordance with the method of claim 1, the requested user object comprising a reference to the accessing user's message queue on the action server and a message queue decryption key;
(e) requesting the message queue from the action server through the identity server, in accordance with the method of claim 1;
(f) the action server retrieving the message queue from a database (1106, 1108) under control of the action server, and returning the message queue to the client application through the identity server, in accordance with the method of claim 1, the message queue comprising a message object previously inserted in the message queue in accordance with claim 4;
(g) reading the message queue decryption key from the user object;
(h) decrypting the message object from the message queue with the message queue decryption key;
(i) reading the message object and obtaining therefrom the data object identifier for encrypted data that had been stored under control of the action server in accordance with claim 4;

(j) generating a challenge request and forwarding the challenge request and the data object identifier to the action server through the identity server, in accordance with the method of claim 1;

(k) the action server encrypting the challenge with the public challenge key that was associated with the data object identifier in accordance with claim 4, and returning the encrypted challenge to the client application through the identity server, in accordance with the method of claim 1;

(l) reading the private challenge key from the message object;

(m) decrypting the encrypted challenge using the private challenge decryption key;

(n) returning the unencrypted challenge together with the data object identifier to the action server through the identity server, in accordance with the method of claim 1;

(o) the action server matching the challenge received with the challenge sent, and retrieving a data element associated with the data object identifier;

(p) sending the data element to the client application through the identity server, in accordance with the method of claim 1;

(q) reading the first decryption key from the message object; and (r) decrypting encrypted data associated with the data element.

In one embodiment, the encrypted data is directly returned to the client application. In an alternative implementation, an object handle, constituting a temporary pre-approval to access one or more objects, is returned, rather than the data object. This has the benefit of allowing large data objects to be returned in many small increments rather than one very large piece.

Result: Data is stored in private, protected fashion. Data is accessible by parties other than the owner. Central data holder does not know the contents or owner of the stored data. Central data holder does not know access rights of others to the stored data. Central data holder is able to apply access privileges to stored data.

Groups (actually known as a collection, inside the code) are treated as meta-collections of users. That is, just as a user has a message queue, so too does a group have a message queue. Just as an object has a challenge key, so too does a group have a challenge key. In practice, a user would have, in his user object, a reference to a group and group challenge to which he belonged.

Again, although the foregoing was presented in the context of a system comprising first and second intermediate servers and Ponoi session protection, such as system could use any other means of network storage, such as a stand-alone storage server with which client applications communicate via secure socket layers (SSL). In addition, a system involving the use of Ponoi session protection could be configured such that data transfers were broken down into data increments and a plurality of identity and action servers were employed in a distributed processing manner.

Detail of System Implementation

Persistent Encryption

Persistent data is protected with stronger encryption than session traffic. The client generates additional symmetric keys to encrypt persistent data. Since the data may be retrieved during a subsequent session, the private, the key must be stored persistently to decrypt the data.

Top-level objects use a pass phrase-based cipher to encrypt the top-level object data. This cipher uses a base-64 encoded, one-way hash of the user's name and password as the seed for a symmetric DES key. Top-level objects are thus protected with the strongest level of encryption. To retrieve the top-level object, the user's name and password are re-hashed and encoded to create a new DES symmetric key to decrypt the user object. The user is thus the only agent capable of decrypting the top-level object without mounting a dictionary attack For all other objects, the client regenerates its persistent-strength 3DES or Blowfish key. The object will be encrypted with this key. The key will be stored in the parent of the object being created. In addition to storing the key, the parent also contains a locator for the child object. Once a user has successfully authenticated and has access privileges to read the parent object, the data needed to both locate and decrypt the object is available (only on the client).

Creation of Locators and Decrypters

To ensure the anonymity of data, the client creates nearly all locators in the system. These are based on a series of one-way hashes of data the user knows but could not be readily guessed (e.g., user name and password). When the user enters authentication data, the client creates the appropriate hashed locator. All other locators in the system are stored encrypted under a top-level object. Users may navigate their 'tree' in memory on the client one level at a time. For example, given a decrypted object, the client application may reference the object locators and decrypters of all child objects directly linked to the parent object. When that object is retrieved and decrypted, it may contain locators to other collections or persistent objects, as well.

| Type | Aspect | Field | Source |
|---|---|---|---|
| User | Object | Locator | HASH(ID) |
|  |  | Decrypter | PBE(ID + PW) |
|  | Access Control | Locator | Server-generated |
|  |  | Decrypter | Server-generated |
| All Other | Object | Locator | RANDOM 40 |
|  |  | Decrypter | Client session key |
|  | Access Control | Locator | Server-generated |
|  |  | Decrypter | Server-generated |

Challenges

Challenges verify that a given user has the credentials necessary to execute a request, typically a persistent storage or retrieval request requiring use of the access control system. All challenges use asymmetric, or public-private, cryptography. To protect against a "known ciphertext" attack against the client by the server, these challenges do not use standard encryption/decryption, but rather use signing/verifying. Thus, the algorithm chosen must support digital signatures.

The challenge system functions as follows:

1. Client request requires verification of identity without furnishing personally-identifiable data
2. Server generates random number R1
3. Server sends R1 to client (may be sent in plaintext)
4. Client receives R1
5. Client generates random number R2
6. Client signs R1 and R2 with private, signing key—S (R1R2)
7. Client sends server signed bytes (may be sent in plaintext)
8. Client sends server R2 (may be sent in plaintext)
9. Server receives R2 and signed response
10. Server verifies challenge with public, verifying key—V (S(R1, R2))=R1, R2=TRUE 11. Client sends request
12. Server processes request Persistent, Private Data Storage Authentication A core component of the Ponoi service is to provide encryption and decryption services that secure users both within single sessions and across multiple sessions.

Authentication begins within a basic Ponoi session and is therefore secure. Successful authentication prompts a registered user Ponoi session. The idServer receives and stores only digests of user name and password for added security.

The access control entry for a user object is encrypted by the server at account creation with passphrase-based encryption (PBE). This cipher is generated by taking a hashing a hash of the user name and double-hash of the user password. The actual user object is protected by the inverse of this (e.g., hashing a double-hash of the user name and a single-hash of the password). Since only the user knows both the name and password of the account, neither hash can be computed from the other.

The client uses the standard access control system to authenticate to an account (user) object. If the user can decrypt both the access control entry and the user object, the user has been authenticated.

Discretionary Access Control

Overview

Unlike most parts of the system, access control is primarily a server-centric component. When creating a new object, the client initiates the create request. The server creates an empty database record and an access control entry for the object, which is returned after the database creation is successful. The client then updates the object with the access control entry. It then encrypts the object and uploads it to the server, which fills the remainder of the database record.

The access control record is stored encrypted on the server. The access controller on the server returns the location of the access control record in the database, as well as two sets of decrypting keys for the access control record. The first key, known as the access decrypter, may be shared with any other user, using a grant access request. The second key, known as the owner decrypter, is used solely to grant and revoke access to other users.

When requesting a create, read, update or delete request on an object, only the access decrypter needs to be furnished. To modify, grant or revoke privileges on an object, the owner decrypter must be supplied as well.

Each access control list may have one or more access control entries. These entries are identified by a random hash, called the access control locator. These locators do not map in any way to the user or account locators discussed earlier. Each locator also has an asymmetric private key used to verify the identity of the requestor, without actually using personally-identifiable information. The client maintains a set of public signing keys that will be used to correctly respond to cryptographic challenges from the server (see Challenges in *Cryptography* above).

CRUD Privileges

To read, modify or delete an object, the client must supply the correct access locator and decrypter for the access control entry. If the server can locate and decrypt the access control entry successfully, and if the permissions decrypted match the permissions required for the request, the server will execute the request. Otherwise, a permission denied exception will be thrown and displayed to the user.

The create privilege works slightly differently than read, update and delete. Create acts on a parent collection, and the create privilege translates to "has privileges to create child objects under this collection". Thus, create acts on a parent, containing object while all other privileges act on the object itself.

Modify

When an object is created, it is assigned the default privileges of create, read, update, delete and modify. To change the permissions on an object, the user must supply the access decrypter and have the modify privilege. To change the modify privilege itself, the user must supply the owner decrypter. An example of a modify request would be changing an object from unlimited privileges to read-only.

Grant

Grant and revoke extend the discretionary access control system by allowing rights to objects to be shared among users and collections. To issue a grant, the user must supply the owner decrypter of the access control record for that object. If the system is able to successfully decrypt both the permissions and the owner encrypted portions of the access record, the server will process the grant request.

A new access control entry is created, based on the existing access control entry. The client portion of this entry (locator and decrypters) will be placed in the requesting user's public in-box. When the user again access his or her account, the in-box will be read by the client and decrypted. The user object will then be updated by the client with the new access control information and saved to the database. At this point, the access control grant is deleted from the user's in-box.

Revoke

Revocation is the mirror-image of granting access. When a user has access revoked, his or her corresponding access control record in the database is invalidated. If the user attempts to use the system to access that record in the future, the locators and decrypters to the data will now be invalid. The user will receive a notification, in their public in-box, that access to a specific object has been revoked. The client will remove the entry from the user's internal list of access control entries and re-save the object. Even with a corrupted client attempting to re-transmit previously valid data will not be able to access the system. No key on the client will decrypt a valid access control entry in the system any longer.

Database Description

Overview

The database design of Ponoi provides persistent, anonymous, encrypted data storage. All data stored in Ponoi is encrypted. All primary keys consist of a one-way hash of the actual primary key name. Only the client application or applet has the ability to locate and decrypt records. See FIG. 12 for a general depiction of this data model.

Object Table

All persistent data stored in the system is saved, encrypted, in the persistent object table. Two types of object exist within the system: collections and objects. Collections may contain other collections or an object. One special type of collection is a user or owner collection. These collections use Ponoi's authentication protocol, currently based on a user name and password, to validate a user's identity. All other object requests take place through the access control sub-system.

The assertion column maps to a server AccessRecord or GroupRecord meta-object. The data column maps to a client PersistentObject, Collection, Group, User or File object.

Queue Table

All objects contain a 'public' inbox that other users in the system may drop encrypted data into. The encrypter column contains the key that will encrypt all data put in the inbox. The verifier is used to challenge the owner for access to view the queue. No challenge is required to add new messages to a queue.

The crypto_settings column maps to a server CryptoSettings meta-object.

Message Table

Each public collection may have zero or more public item children. The encrypter from the parent public collection will be used by the client to encrypt the data for the public item. One use of the public inbox for a user is the granting and revocation of access control rights to other objects or users.

The data column maps to a client Message meta-object.

System Values Table

The system values table holds global data not pertaining to any user or group's persistent data. The only current use of this table is to hold the server, private trust key, used to assure secure key exchange (see Session Cryptography above).

Object Meta-Data Description

Overview

Two primary types of data exist encrypted in the database: persistent objects and access control data Persistent objects include binary data, collections and users. Access control data is used to validate that a given user's request is allowed under the owner's specified permissions. Cryptography protects both the persistent objects and their associated access control entries such that the system never has sufficient information to decrypt both, or to associate a given access control entry with an object.

Figure 13:
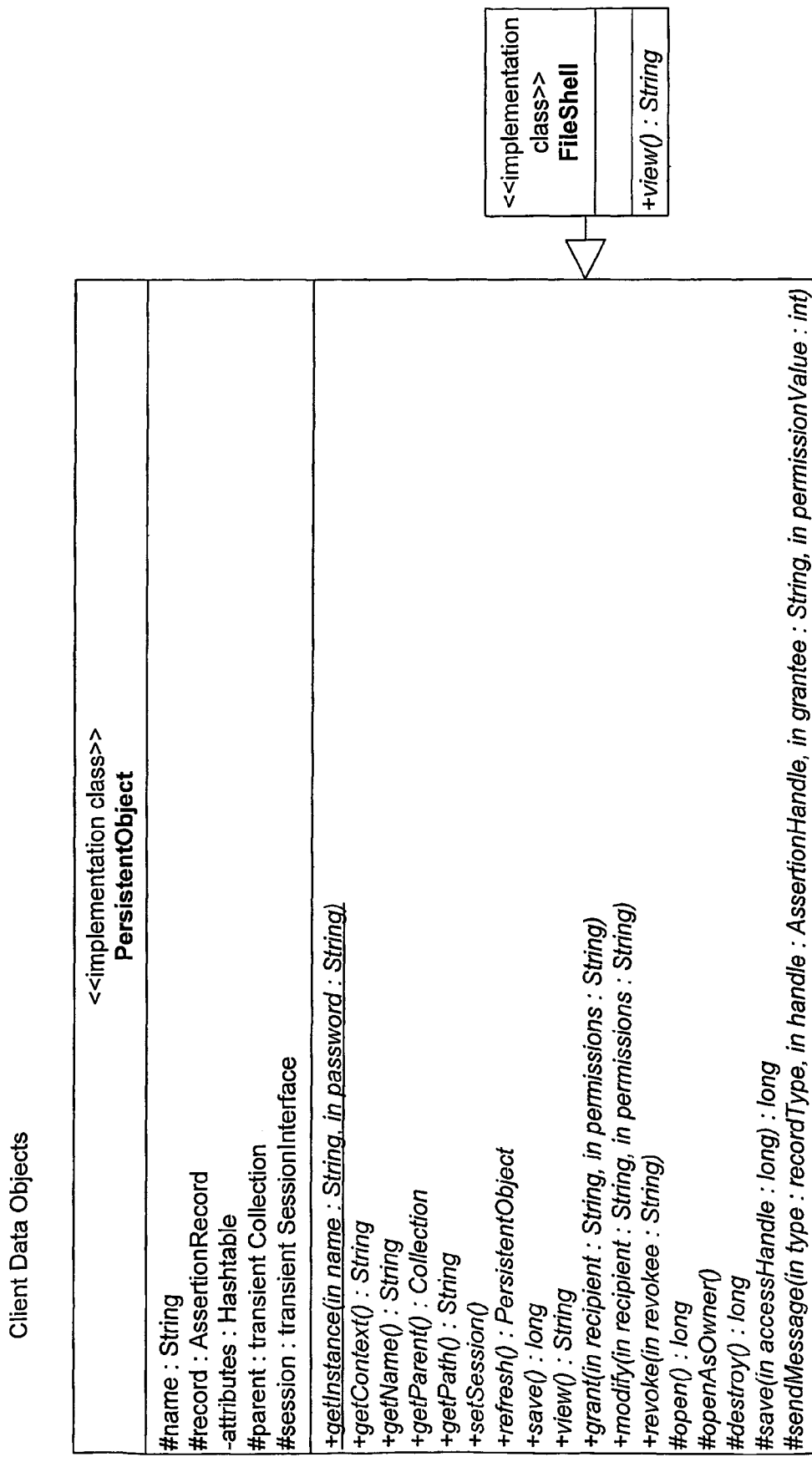
Figure 13:
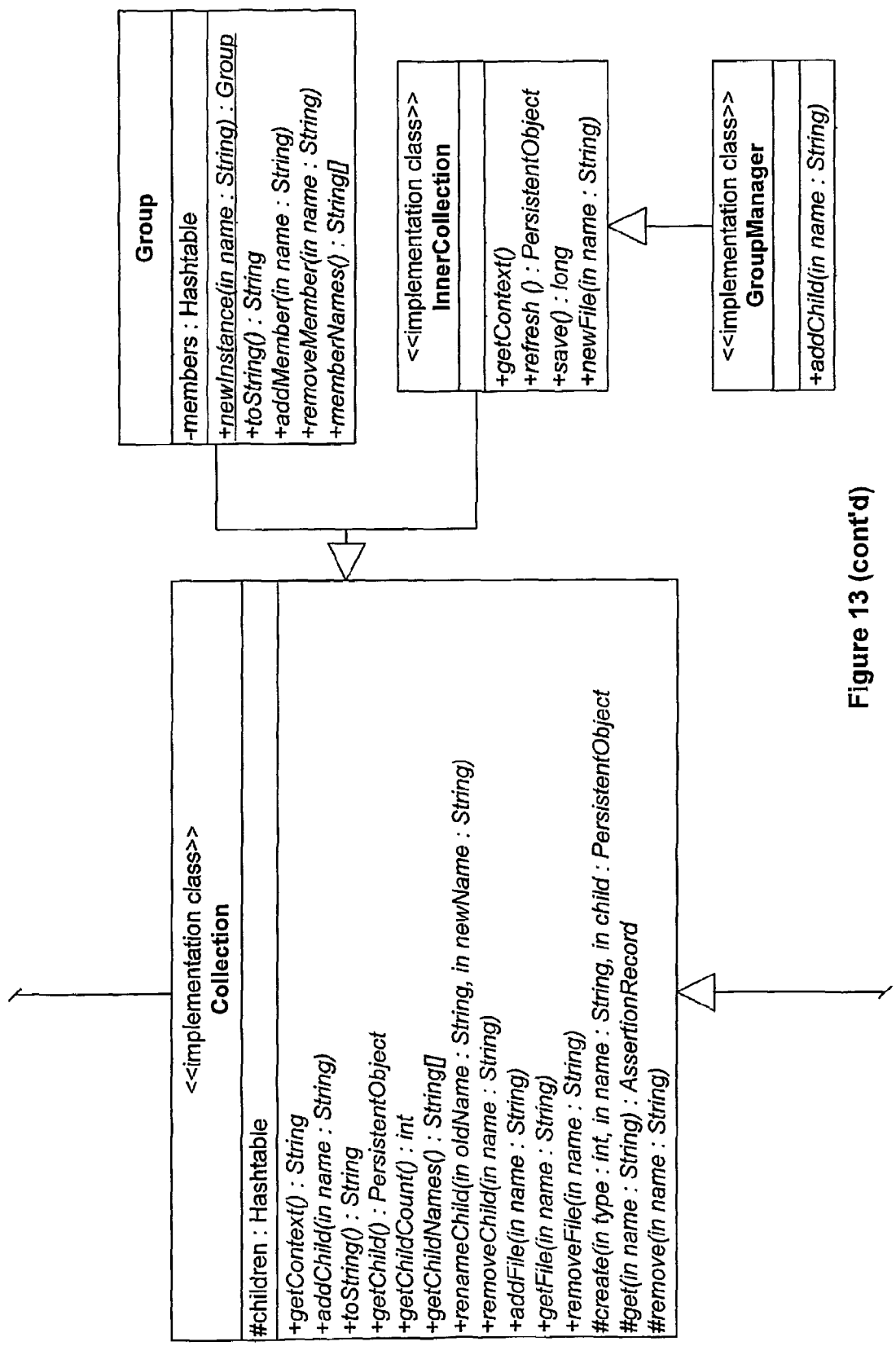
Figure 13:
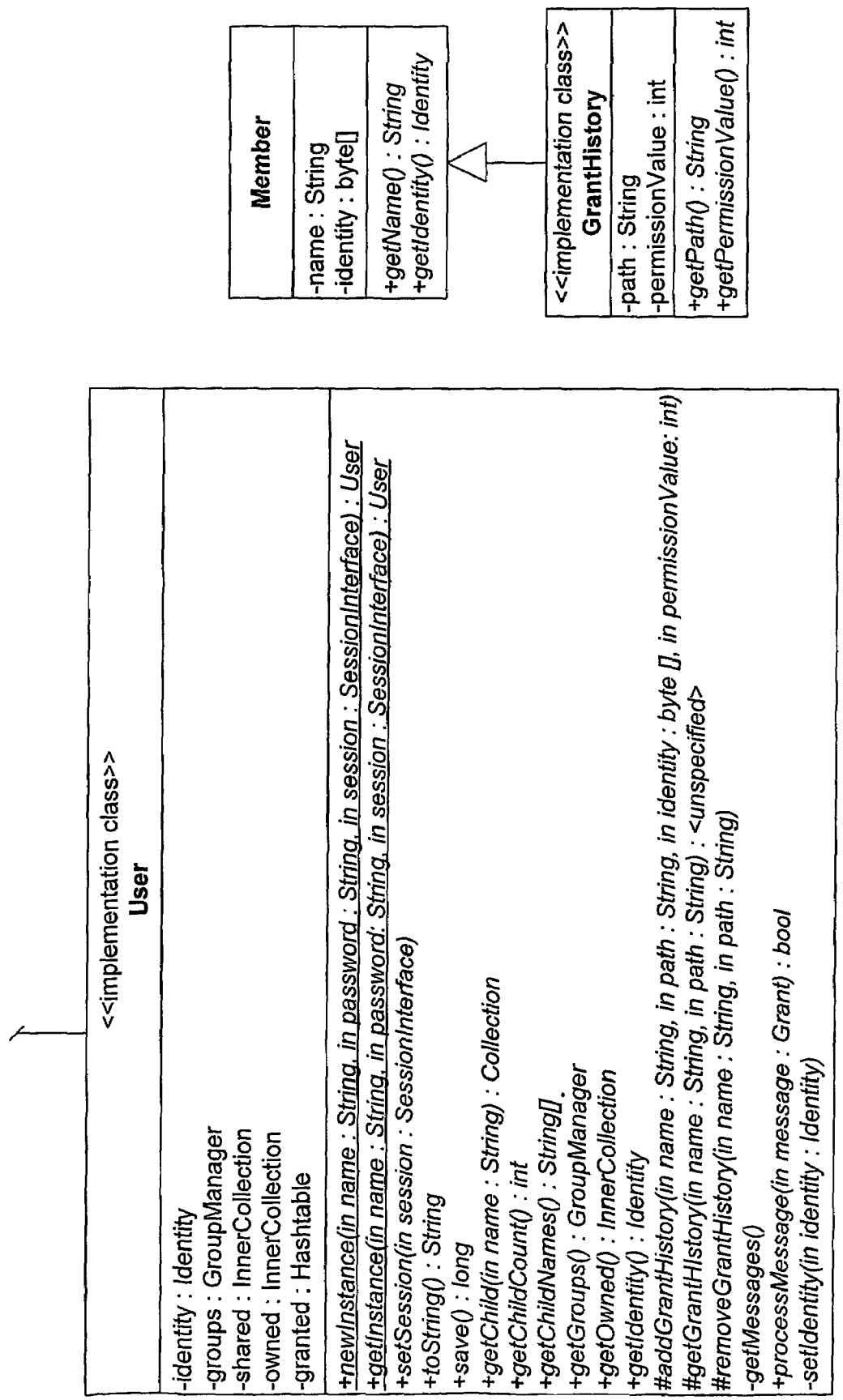
Figure 14:
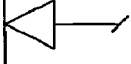
Figure 14:
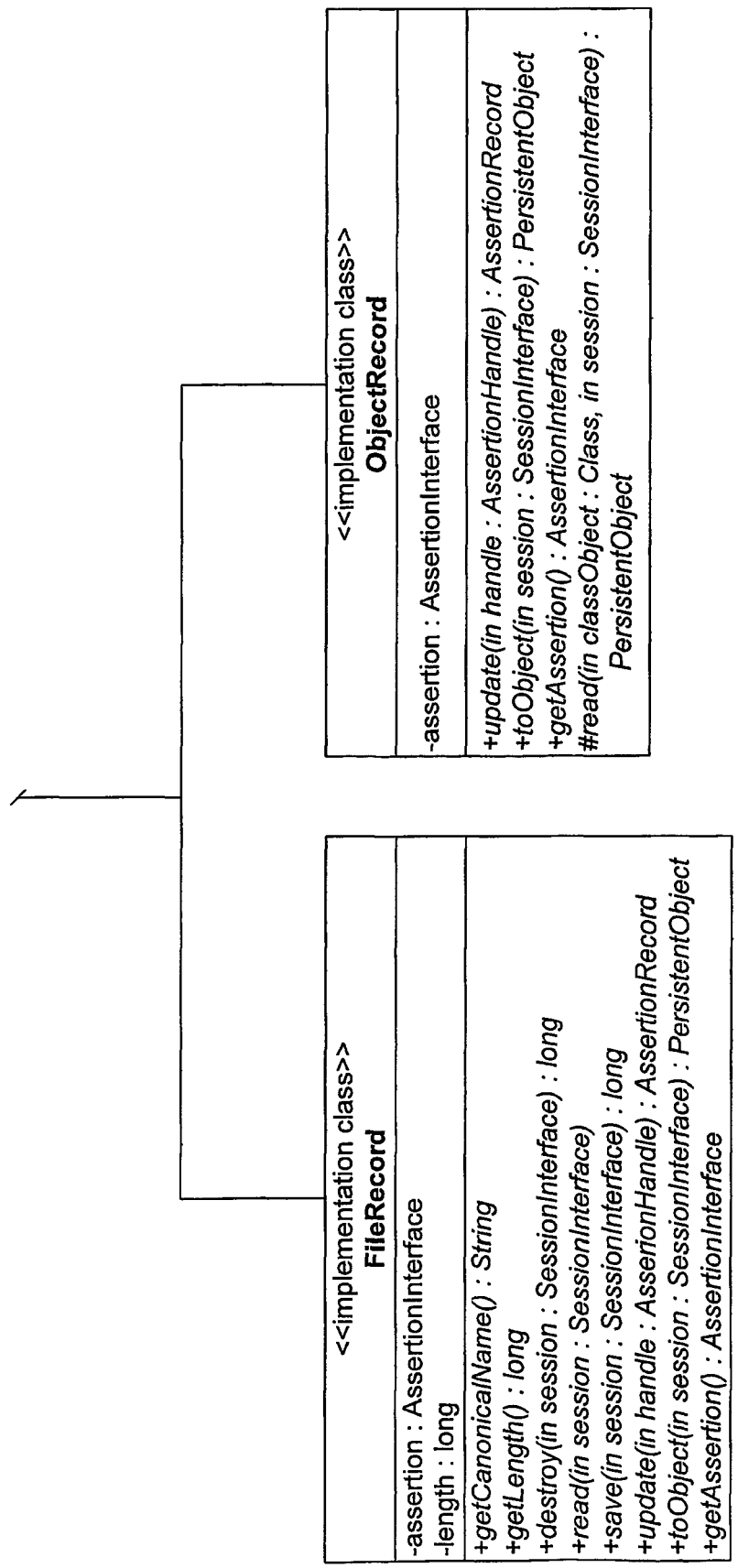

Data Objects (FIGS. 13 and 14)

All persistent data in the system, whether a user account, collection or binary data is stored as a PersistentObject. Each object must have a name, which is unique within its parent Collection (if a child object) or the all top-level objects (if a top-level object). In addition, all objects contain an ObjectRecord, which contains the information needed to locate the object in the database and the keys to decrypt it.

Each object contains an ObjectRecord. This describes which database tables the object and its associated access control data are stored. Ill addition, the primary key for both the object and its access record, as well as all persistent private keys needed to decrypt the data, are stored in the ObjectRecord. These ObjectRecord entries are also stored in the children element of a Collection. This way, a parent collection 'knows' how to locate all child objects or collections once decrypted properly.

Any object in the system may have zero of more text attributes associated with it. A file object, for example, may store the actual local filesystem location that the file was uploaded from as well as the unencrypted size of the file.

Collection inherits from PeristentObject. A Collection may contain other PersistentObject or Collection objects, forming a hierarchical tree. The children element contains the records of these other objects. Each child record must be loaded from the database separately. Only the ObjectRecord of a given child is loaded when the object is decrypted. It contains the information needed to locate and decrypt the object and its associated access control record. To actually retrieve the object, a request for the object must be made and access control validated before the actual object will be returned to the client.

Figure 15:
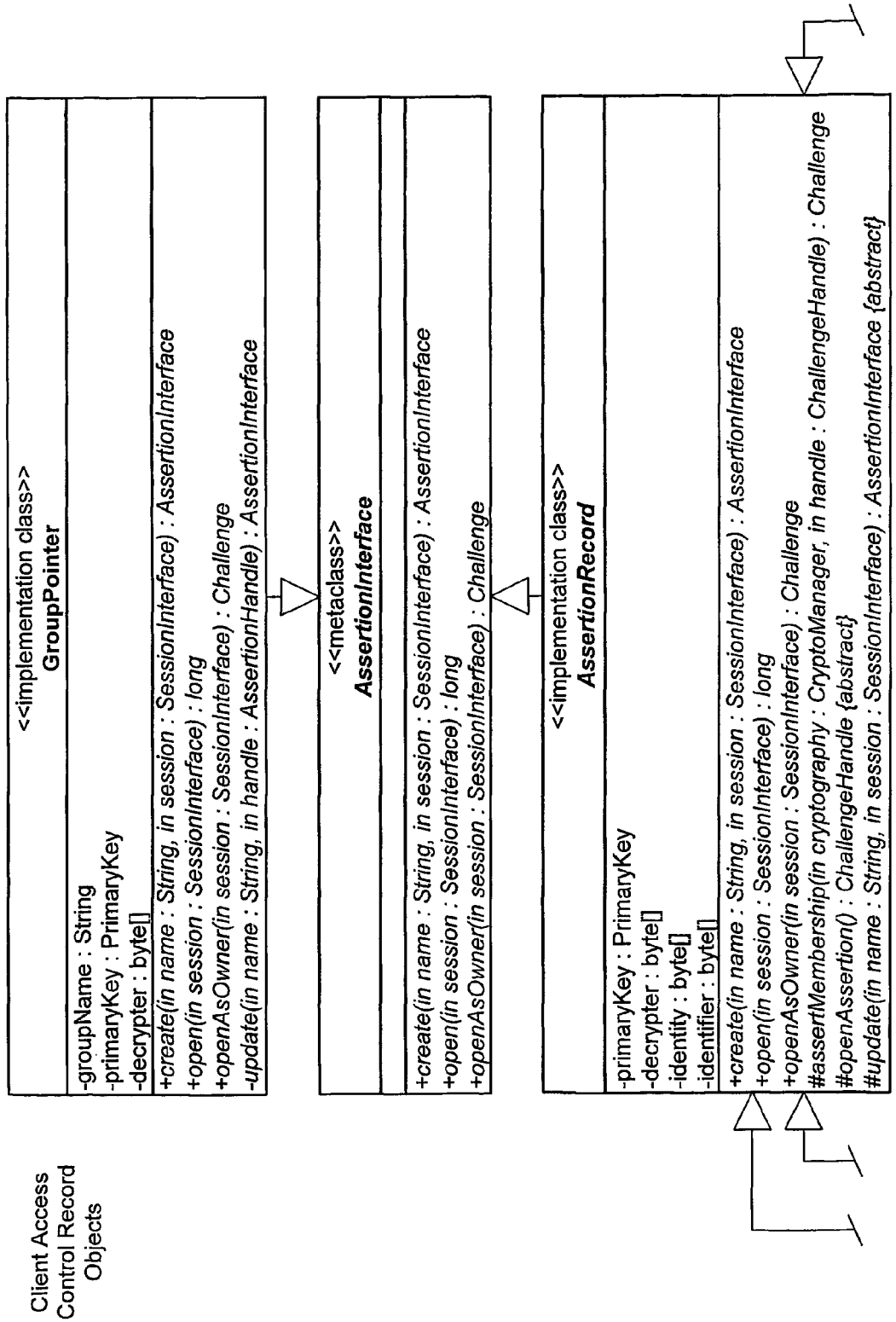
Figure 15:
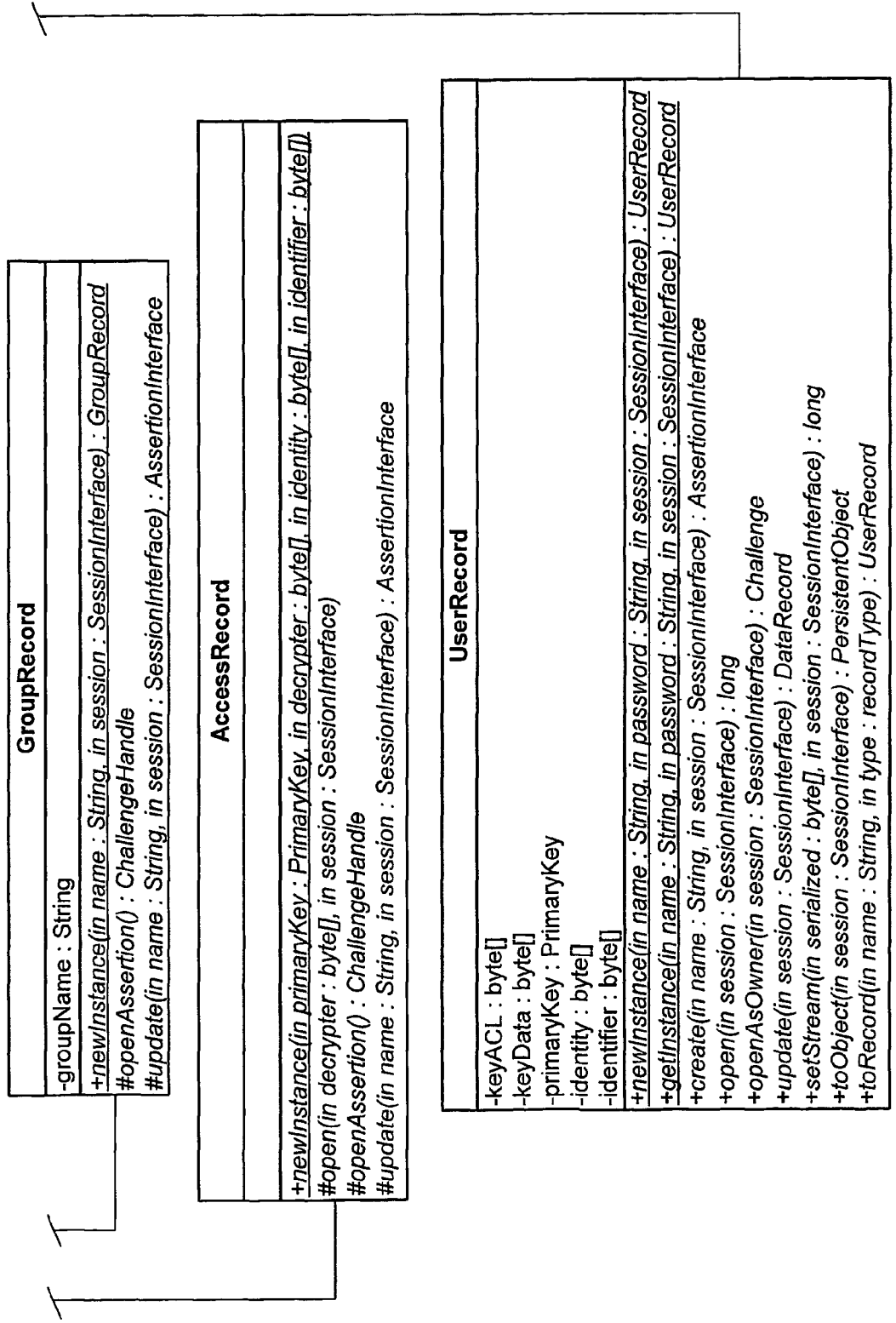
Figure 16:
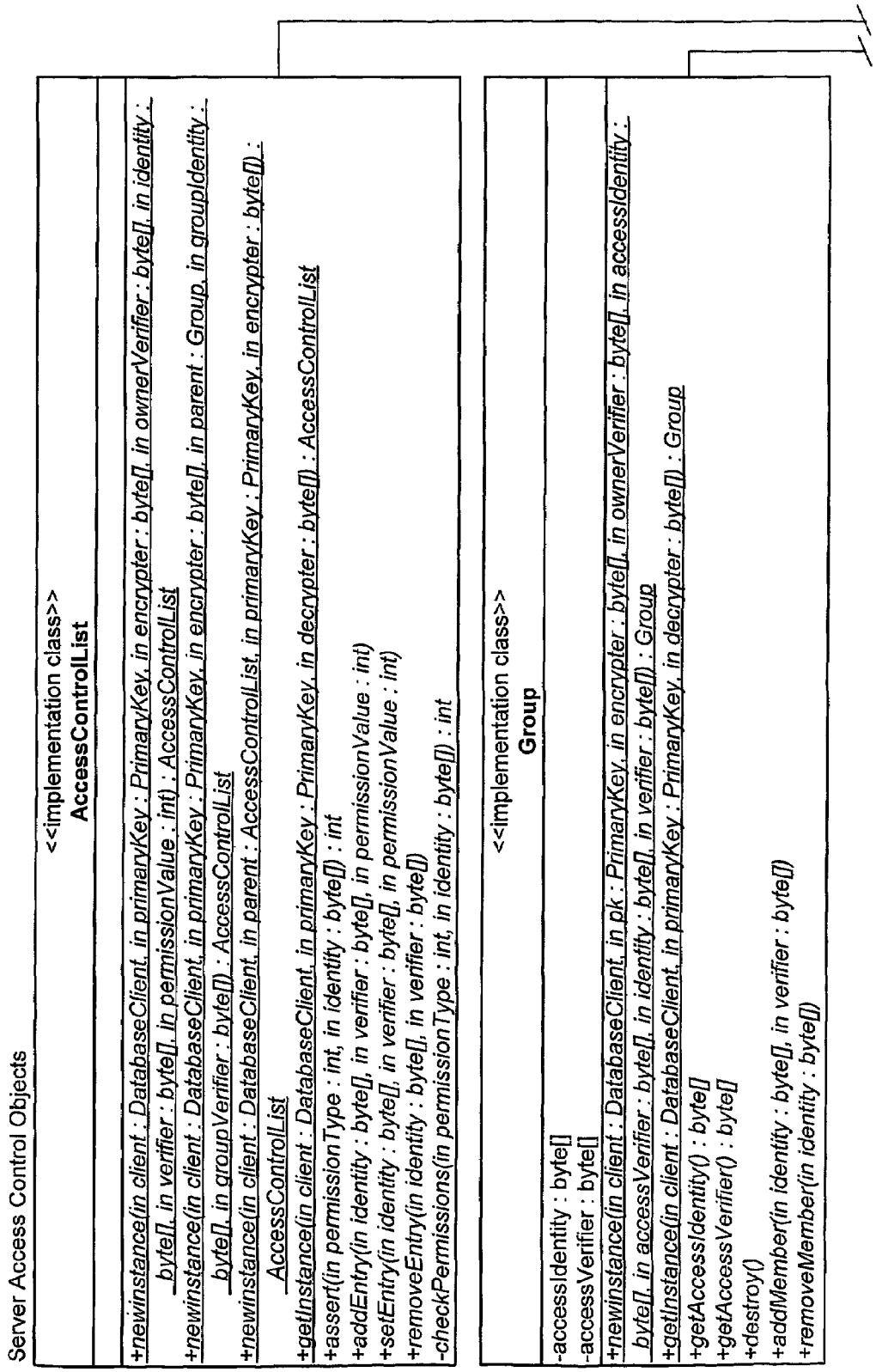
Figure 16:
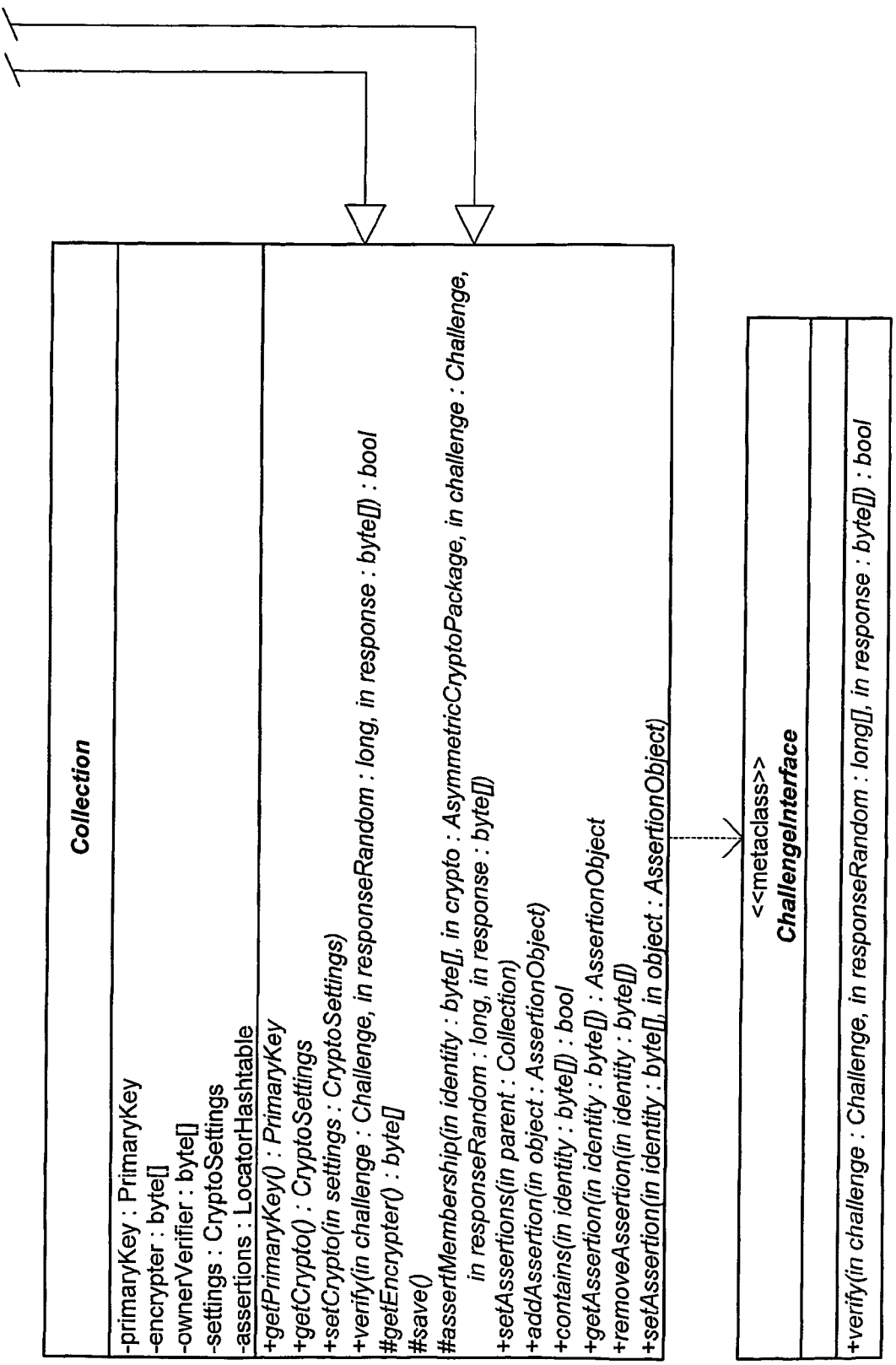

Access Control Objects (FIGS. 15 and 16)

AccessRecords exist only in the database and on Ponoi servers. The AccessRecord contains the permissions of for a given PersistentObject as well as the encrypting keys needed to re-encrypt the access control record in case of an access control change request (grant, modify or revoke). The ownerEncrypter is actually stored encrypted with itself. To assert ownership over an object, the user must additionally correctly respond to a challenge using the ownerVerifier, which differs from the standard verifier.

Any request that finishes a valid accessDecrypter that decrypts the access control entry and successfully responds to a cryptographic challenge from the server allows a permission check. For create requests, the system checks the parent collection for the rights to create child objects (create privilege). For other object requests (read, update and delete privileges), the system checks the access control permissions on the object itself.

For access control modifications (grant, modify and revoke privileges), the client must correctly respond to an ownership cryptographic challenge, as above. If successful, then the owner is allowed to re-save the access control entry or create a copy to place in another user's public inbox.

In an alternate embodiment of the invention, the primary components of Ponoi, the client, Identity Server, and Action Server, exist as processes on computers. For example, the client would exist as a code library inside a client application on a portable digital assistant (PDA). The Identity Server and Action Server would exist as one or more code libraries or objects interoperating with a network-based server such as a database or content management system. In this embodiment, the functions of protecting session traffic, data storage, and access control would occur through the intercommunication of these Ponoi processes residing on multiple computers.

It is apparent from the foregoing that the present invention achieves the specified objects of providing secure and anonymous use of a communications network, as well as the other objectives outlined herein. While the certain specific embodiments of the invention have been described in detail, it will be apparent to those skilled in the art that the principles of the invention are readily adaptable to other implementations and system configurations and communications paradigms without departing from the scope and spirit of the invention, as defined in the following claims.

We claim:

1. A method for providing session protection for user privacy over a network, by means including at least a client and a remote server, wherein a user, using a client application, may submit a request through said client for a specified action to be performed in response to said request by said remote server, said user-submitted request comprising identity information that identifies the user making the request, and action information that specifies the action requested from said remote server by said user, wherein said communications are provided in a secure and anonymous manner in that said action information is submitted to said remote server without revealing said identity information to said remote server, and in that only said client, and not any facility through which said action information or any response thereto passes in the course of being submitted to or received from said remote server, possesses both said identity information and said action information, said system comprising (in addition to said client and remote server):

(a) separating, within said client application, said identity information and said action information from the user's information request, encrypting said action information, and sending said identity information and said action information as so encrypted to an identity server;

(b) transmitting said encrypted action information from said identity server to an action server;

(c) decrypting, within said action server, said action information, transmitting said decrypted action information to said remote server, receiving the remote server's response, encrypting said remote server response, and transmitting said encrypted remote server response to said identity server;

(d) receiving, within said identity server said encrypted remote server response from said action server, associating said encrypted remote server response with said identity information and sending said encrypted remote server response to said client application; and (e) decrypting, within said client application, said remote server response and forwarding said decrypted remote server response to said client for presentation to said user.

2. The method of claim 1 wherein said identity server and said action server are implemented as processes or threads which may execute on the same or different computers.

3. The method of claim 1 carried out in a distributed operating environment in which there are a plurality of users, a plurality of identity servers and a plurality of action servers, all communicating in accordance with the method of claim 1.

* * * * *